US010499361B2

(12) United States Patent
Kuang

(10) Patent No.: US 10,499,361 B2
(45) Date of Patent: Dec. 3, 2019

(54) PORTABLE ELECTRONIC DEVICE AND POSITIONING METHOD

(71) Applicant: Huawei Technologies Co., Ltd., Shenzhen (CN)

(72) Inventor: Yunsheng Kuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/302,925

(22) PCT Filed: May 17, 2016

(86) PCT No.: PCT/CN2016/082329
§ 371 (c)(1),
(2) Date: Nov. 19, 2018

(87) PCT Pub. No.: WO2017/197578
PCT Pub. Date: Nov. 23, 2017

(65) Prior Publication Data
US 2019/0281575 A1 Sep. 12, 2019

(51) Int. Cl.
*H04W 64/00* (2009.01)
*G01S 11/06* (2006.01)
*G01S 5/10* (2006.01)

(52) U.S. Cl.
CPC .............. *H04W 64/003* (2013.01); *G01S 5/10* (2013.01); *G01S 11/06* (2013.01)

(58) Field of Classification Search
CPC ............ G01S 19/34; G01S 19/52; G01S 5/02; H04M 1/72572; H04M 2250/06;
(Continued)

(56) References Cited

U.S. PATENT DOCUMENTS

2006/0119508 A1\* 6/2006 Miller .................... G01S 19/34
342/357.77
2009/0201012 A1 8/2009 Rost et al.
(Continued)

FOREIGN PATENT DOCUMENTS

CN  101472778 A  7/2009
CN  102685677 A  9/2012
(Continued)

OTHER PUBLICATIONS

Dahlgren, E., et al., "Evaluation of indoor positioning based on Bluetooth Smart technology," XP55141536, Master of Science Thesis in the Programme Computer Systems and Networks, Jun. 2014, 92 pages.
(Continued)

*Primary Examiner* — Nathan S Taylor
(74) *Attorney, Agent, or Firm* — Conley Rose, P.C.

(57) ABSTRACT

A portable electronic device includes a processor configured to determine a first scan interval, and a transceiver configured to receive a first beacon signal using the first scan interval as an interval. The processor is further configured to obtain a first positioning result according to received signal strength of beacon signals received by a transceiver—in m continuous first scan intervals, and determine an average quantity of scans according to the first positioning result, the transceiver is further configured to receive a second beacon signal using an increased second scan interval as an interval when the average quantity of scans is greater than a preset value, and the processor is further configured to obtain a second positioning result according to received signal strength of beacon signals received in p continuous second scan intervals, where m and p are integers greater than one.

15 Claims, 16 Drawing Sheets

(58) Field of Classification Search
CPC ......... H04M 2250/10; H04M 2250/12; H04W 36/0088; H04W 36/30; H04W 36/32; H04W 52/0254; H04W 4/02; H04W 52/0245; H04W 64/00; H04W 4/30; H04W 52/02; H04W 52/0216; H04W 52/0219; H04W 52/0229; Y02D 70/122; Y02D 70/126; Y02D 70/14
USPC ............... 342/357.77; 455/127.5, 343.1, 434
See application file for complete search history.

(56) References Cited

U.S. PATENT DOCUMENTS

| | | | |
|---|---|---|---|
| 2012/0063340 A1* | 3/2012 | Waters | G01S 5/0242 370/252 |
| 2012/0134312 A1 | 5/2012 | Kim et al. | |
| 2013/0084856 A1* | 4/2013 | Prasad | H04W 36/0088 455/434 |
| 2013/0210425 A1* | 8/2013 | Nagaraj | H04B 1/3805 455/432.1 |
| 2014/0050210 A1* | 2/2014 | Waters | H04W 64/00 370/338 |
| 2014/0341069 A1* | 11/2014 | Alon | H04W 48/16 370/254 |
| 2017/0086204 A1* | 3/2017 | Jung | H04W 4/80 |
| 2017/0208564 A1* | 7/2017 | Lee | H04W 4/80 |
| 2018/0220261 A1* | 8/2018 | Nagaraj | H04B 1/3805 |
| 2018/0220335 A1* | 8/2018 | Lee | H04W 52/0229 |
| 2018/0376419 A1* | 12/2018 | Li | H04W 52/0222 |
| 2019/0200161 A9* | 6/2019 | Waters | H04W 4/02 |

FOREIGN PATENT DOCUMENTS

| | | |
|---|---|---|
| CN | 103200678 A | 7/2013 |
| CN | 103442428 A | 12/2013 |
| CN | 104115533 A | 10/2014 |
| CN | 104359480 A | 2/2015 |
| CN | 104464368 A | 3/2015 |
| JP | 2015100060 A | 5/2015 |

OTHER PUBLICATIONS

Foreign Communication From a Counterpart Application, European Application No. 16901964.3, Extended European Search Report dated Mar. 19, 2019, 10 pages.
Machine Translation and Abstract of Chinese Publication No. CN102685677, Sep. 19, 2012, 15 pages.
Machine Translation and Abstract of Chinese Publication No. CN104359480, Feb. 18, 2015, 19 pages.
Machine Translation and Abstract of Chinese Publication No. CN104464368, Mar. 25, 2015, 9 pages.
Machine Translation and Abstract of Japanese Publication No. JP2015100060, May 28, 2015, 16 pages.
Foreign Communication From a Counterpart Application, PCT Application No. PCT/CN2016/082329, English Translation of International Search Report dated Feb. 7, 2017, 2 pages.
Foreign Communication From a Counterpart Application, PCT Application No. PCT/CN2016/082329, English Translation of Written Opinion dated Feb. 7, 2017, 5 pages.
Machine Translation and Abstract of Chinese Publication No. CN103200678, dated Jul. 10, 2013, 11 pages.
Machine Translation and Abstract of Chinese Publication No. CN103442428, dated Dec. 11, 2013, 14 pages.
Foreign Communication From a Counterpart Application, Chinese Application No. 201680025553.X, Chinese Office Action dated Aug. 5, 2019, 7 pages.

\* cited by examiner

PORTABLE ELECTRONIC DEVICE AND POSITIONING METHOD

CROSS-REFERENCE TO RELATED APPLICATIONS

This application is a U.S. National Stage of International Patent Application No. PCT/CN2016/082239 filed on May 17, 2016, which is hereby incorporated by reference in its entirety.

TECHNICAL FIELD

This application relates to wireless positioning technologies, and in particular, to a portable electronic device and a positioning method.

BACKGROUND

A wireless positioning system is a system in which a wireless positioning technology is used to position a wireless communications device (for example, a portable electronic device) in a positioning area.

Generally, in implementation of the wireless positioning system, some wireless beacons are deployed in the positioning area. These wireless beacons periodically transmit radio signals, and the wireless communications device in the positioning area performs positioning calculation according to strength of a received radio signal.

The following describes an operating principle of the wireless positioning system by using a Bluetooth positioning system as an example.

The Bluetooth positioning system is a wireless positioning system based on a technology such as Bluetooth (Bluetooth) or Bluetooth low energy (Bluetooth Low Energy, BLE).

During implementation of the Bluetooth positioning system, some small Bluetooth beacons (beacon) are deployed in a positioning area. Each beacon periodically broadcasts a beacon signal. After entering the positioning area, the portable electronic device receives beacon signals transmitted by one or more neighboring beacons. The portable electronic device may perform positioning calculation according to a received signal strength indicator (Received Signal Strength Indicator, RSSI) of the received beacon signal, to obtain a location of the portable electronic device in the positioning area.

Generally, the beacons run in a mutually independent manner, there is no connection between the beacons, and a collaboration mechanism cannot be used. Consequently, beacon signals transmitted by different beacons are mutually interfered with, and therefore the portable electronic device cannot correctly receive the beacon signal.

The portable electronic device needs to perform positioning according to the RSSI of the received beacon signal, and therefore positioning precision of the portable electronic device is reduced when the portable electronic device cannot correctly receive the beacon signal.

In conclusion, how to improve positioning precision of the wireless positioning system is a problem that needs to be urgently resolved.

SUMMARY

In view of this, a positioning method of a portable electronic device is provided, so as to improve positioning precision of a wireless positioning system.

According to a first aspect, a positioning method is provided.

In the method, the portable electronic device receives a beacon signal transmitted by at least one beacon in a positioning area, and determines, according to the received beacon signal, a broadcast period (herein, denoted as a "first broadcast period") of transmitting the beacon signal by the beacon in the positioning area.

The portable electronic device determines a scan interval (herein, denoted as a "first scan interval") according to the determined first broadcast period, and receives a beacon signal by using the first scan interval as an interval.

The portable electronic device performs positioning calculation according to the scan interval, and obtains a positioning location in one scan interval. Herein, the portable electronic device receives beacon signals in m continuous first scan intervals, and obtains a positioning result (herein, referred to as a "first positioning result") according to received signal strength of the beacon signals received in the m continuous first scan intervals. The first positioning result includes m positioning locations. The $k^{th}$ positioning location in the m positioning locations is obtained according to received signal strength of a beacon signal received in the $k^{th}$ first scan interval in the m continuous first scan intervals, and m is an integer greater than 1.

The portable electronic device determines an average quantity of scans according to the m positioning locations in the obtained first positioning result.

The average quantity of scans is an average value of quantities of appearance times of different positioning locations in the positioning result obtained in the m first scan intervals, and is used to represent a quantity of appearance times of a same positioning location.

A larger average quantity of scans indicates that a movement speed of the portable electronic device is lower, and more beacon signals from a same beacon are received by the portable electronic device; and a smaller average quantity of scans indicates that the movement speed of the portable electronic device is higher, and fewer beacon signals from a same beacon are received by the portable electronic device. The movement speed of the portable electronic device may be measured by determining the average quantity of scans.

When determining, according to the m positioning locations, that the average quantity of scans is greater than a preset threshold of an average quantity of scans, the portable electronic device increases the scan interval (herein, an increased scan interval is denoted as a "second scan interval"), and the portable electronic device receives a beacon signal by using the second scan interval as an interval, and obtains, according to received signal strength of beacon signals received in p continuous second scan intervals, a second positioning result that includes p other positioning locations. The $j^{th}$ positioning location in the p other positioning locations is obtained according to received signal strength of a beacon signal received in the $j^{th}$ second scan interval in the p continuous second scan intervals, p is a preset integer greater than 1, and j is an integer greater than 1 and not greater than p. It should be understood that m and p may be equal, or m and p may not be equal.

The portable electronic device sets the scan interval according to the broadcast period of the beacon signal, so that a relationship between a scan packet loss rate (a probability that a packet loss occurs in all beacon signals sent by the beacon in a scan interval) and the scan interval is taken into consideration, and an appropriate scan interval may be set, to reduce the scan packet loss rate.

A larger average quantity of scans indicates that the portable electronic device can receive more beacon signals from a same beacon in a same statistical duration (that is, at least one scan interval), and a probability that a jump occurs in the positioning locations obtained by means of positioning is lower, and therefore positioning precision can be ensured. By using the preset threshold of the average quantity of scans, the jump occurring in the positioning locations may be avoided, thereby ensuring the positioning precision. When the positioning precision is ensured, the scan packet loss rate may be reduced by increasing the scan interval, thereby further improving the positioning precision.

In an optional implementation, if the average quantity of scans determined according to the p other positioning locations is not greater than the threshold of the average quantity of scans, and a location jump occurs in the p other positioning locations, the second scan interval is reduced until no location jump occurs in a positioning location included in an obtained positioning result.

In an optional implementation, when the average quantity of scans determined after the positioning scan is performed at the second scan interval is not greater than the threshold of the average quantity of scans, and no location jump occurs in a positioning location included in an obtained positioning result, the second scan interval keeps unchanged, so as to avoid a jump occurring in a positioning location, thereby ensuring specific positioning precision.

In an optional implementation, when the average quantity of scans determined after the positioning scan is performed at the first scan interval is not greater than the threshold of the average quantity of scans, and no location jump occurs in a positioning location included in an obtained positioning result, the first scan interval keeps unchanged, so as to avoid a jump occurring in a positioning location, thereby ensuring specific positioning precision.

In an optional implementation, in setting the first scan interval, the first scan interval may be set to be x times as long as the first broadcast period, where x is a quantity of frequency channel numbers that can be used during beacon signal transmission in a positioning area, for example, x is equal to 3.

It is described in the following specific embodiment that a longer scan interval indicates a lower scan packet loss rate, the scan packet loss rate is quickly decreased with an increase of the scan interval when the scan interval is not greater than x times of the broadcast period of the beacon signal, and the scan packet loss rate is not quickly decreased any longer with the increase of the scan interval when the scan interval is greater than the x times of the broadcast period of the beacon signal.

In addition, considering that a longer scan interval indicates a higher possibility that a jump occurs in a positioning location, when an initial positioning scan is performed before the scan interval is adjusted, the scan interval may be set to be x times as long as the broadcast period of the beacon signal, so that the scan interval can be adjusted to obtain an appropriate value as soon as possible, to obtain relatively high positioning precision.

For example, in a positioning area, if the quantity of frequency channel numbers that can be used for a beacon signal is 3, the first scan interval may be set to be three times as long as the first broadcast period, so that an accurate positioning result can be obtained more easily.

In an optional implementation, for obtaining the positioning result, the portable electronic device may obtain the positioning result according to the received signal strength of the received beacon signal and a positioning algorithm. Alternatively, the portable electronic device sends the received signal strength of the received beacon signal to a positioning server, and obtains the positioning result from the positioning server.

Two different types of positioning calculation methods are provided herein, and an appropriate method may be used according to a system implementation requirement. For example, when the positioning server is relatively close to a positioning area, the positioning server can feed back a positioning result to the portable electronic device within a relatively short time, and in this case, the method in which the positioning server is used for performing the positioning calculation may be used, so that processing load of the portable electronic device can be effectively reduced, and power consumption of the portable electronic device is reduced. For another example, if the portable electronic device does not support the positioning calculation, the method in which the positioning server is used for performing the positioning calculation may also be used.

In an optional implementation, the portable electronic device may determine the first broadcast period, that is, a broadcast period of transmitting a beacon signal by a beacon in a positioning area, in the following manner:

separating the beacon signal received by the transceiver to obtain n groups of beacon signals, where n is a positive integer, beacon signals in a group are sent from a same source, and beacon signals in different groups are sent from different sources; and performing the following operations on each group of beacon signals in the n groups of beacon signals: calculating an interval duration between two neighboring beacon signals according to a time sequence of receiving all beacon signals in a group of beacon signals, to obtain an interval duration sequence;

screening interval durations from the obtained interval duration sequence according to a preset first threshold, so that a difference between any two screened interval durations is less than the first threshold;

determining a second broadcast period of the group of beacon signals according to at least one of all screened interval durations, where for example, for each group of beacon signals, remaining time intervals in the screened time interval sequence may be averaged, to obtain the second broadcast period of the group of beacon signals;

removing a second broadcast period from obtained n second broadcast periods, where a difference between the second broadcast period and another second broadcast period is greater than a preset second threshold; and determining the first broadcast period according to at least one of all remaining second broadcast periods in the n second broadcast periods.

For example, all remaining second broadcast periods obtained by means of screening may be averaged, an obtained average value is corresponded to a closest broadcast period range, and a broadcast period of a beacon signal in the positioning area is the first broadcast period.

In the method for determining the broadcast period, a packet loss possibility is considered, and therefore an inaccurate time interval and second broadcast period are screened out, so as to ensure that a relatively accurate first broadcast period is obtained.

According to a second aspect, a portable electronic device is provided. The portable electronic device has a function of implementing behavior of the portable electronic device in the method of the first aspect. The function may be implemented by hardware, or may be implemented by executing corresponding software by hardware. The hardware or the software includes one or more modules corresponding to the function.

In an optional implementation solution, a structure of the portable electronic device includes a processor and a transceiver. The processor is configured to support the portable electronic device in performing the corresponding function in the method of the first aspect. The transceiver is configured to support the portable electronic device in receiving a beacon signal; and optionally, the transceiver is further configured to: send received signal strength of the beacon signal to a positioning server, and receive a positioning result from the positioning server. The portable electronic device may further include a memory. The memory is configured to be coupled to the processor and store a program instruction and data that are necessary for the portable electronic device.

According to a third aspect, an embodiment of this application provides a wireless positioning system. The wireless communications system includes the portable electronic device and the at least one beacon according to the first aspect, and optionally, may further include a positioning server.

According to a fourth aspect, an embodiment of this application provides a computer storage medium, configured to store a computer software instruction used by the portable electronic device in the first aspect, where the computer storage medium includes a program designed for executing the foregoing aspect.

According to a fifth aspect, another positioning method is provided.

In the method, the portable electronic device receives a beacon signal transmitted by at least one beacon in a positioning area, and determines, according to the received beacon signal, a broadcast period (herein, denoted as a "first broadcast period") of transmitting the beacon signal by the beacon in the positioning area.

The portable electronic device determines a scan interval (herein, denoted as a "first scan interval") according to the first broadcast period, receives a beacon signal by using the first scan interval as an interval, and obtains a positioning result (herein, referred to as a "first positioning result") according to a received signal strength indicator of a beacon signal received in one first scan interval.

The portable electronic device determines a movement speed of the portable electronic device, and adjusts the scan interval (herein, an adjusted scan interval is denoted as a "second scan interval") according to a correspondence between the movement speed and a second scan interval.

The portable electronic device receives a beacon signal by using the second scan interval as an interval, and obtains a positioning result (herein, denoted as a "second positioning result") according to received signal strength of a beacon signal received in one second scan interval.

Optionally, the first scan interval is not equal to the second scan interval.

The portable electronic device sets the scan interval according to the broadcast period of the beacon signal, so that a relationship between a scan packet loss rate and the scan interval is taken into consideration, and an appropriate scan interval may be set, to reduce the scan packet loss rate.

A lower movement speed of the portable electronic device indicates that the portable electronic device can receive more beacon signals from a same beacon in a same statistical duration (that is, at least one scan interval), and a probability that a jump occurs in the positioning locations obtained by means of positioning is lower, and therefore positioning precision can be ensured. By using a preset movement speed threshold, the jump occurring in the positioning locations may be avoided, thereby ensuring the positioning precision. When the positioning precision is ensured, the scan packet loss rate may be reduced by increasing the scan interval, thereby further improving the positioning precision.

In an optional implementation, similar to the first aspect, the first scan interval may be set to be x times as long as the broadcast period, so that the scan interval can be adjusted to an appropriate value as soon as possible, to obtain relatively high positioning precision. For example, x is equal to 3.

In an optional implementation, similar to the first aspect, for obtaining the positioning result, the portable electronic device may obtain the positioning result according to the received signal strength of the received beacon signal and a positioning algorithm. Alternatively, the portable electronic device sends the received signal strength of the received beacon signal to a positioning server, and obtains the positioning result from the positioning server. An appropriate method may be used according to a system implementation requirement.

In an optional implementation, the portable electronic device may determine the movement speed of the portable electronic device according to at least two obtained positioning locations. A method for determining the movement speed of the portable electronic device according to the positioning result is provided.

In an optional implementation, the portable electronic device may also use the method the same as that in the first aspect to determine the first broadcast period.

According to a sixth aspect, a portable electronic device is provided. The portable electronic device has a function of implementing behavior of the portable electronic device in the method of the fifth aspect. The function may be implemented by hardware, or may be implemented by executing corresponding software by hardware. The hardware or the software includes one or more modules corresponding to the function.

In an optional implementation solution, a structure of the portable electronic device includes a processor and a transceiver. The processor is configured to support the portable electronic device in performing the corresponding function in the method of the fifth aspect. The transceiver is configured to support the portable electronic device in receiving a beacon signal; and optionally, the transceiver is further configured to: send received signal strength of the beacon signal to a positioning server, and receive a positioning result from the positioning server. The portable electronic device may further include a memory. The memory is configured to be coupled to the processor and store a program instruction and data that are necessary for the portable electronic device.

According to a seventh aspect, an embodiment of this application provides a wireless positioning system. The wireless communications system includes the portable electronic device and the at least one beacon according to the fifth aspect, and optionally, may further include a positioning server.

According to an eighth aspect, an embodiment of this application provides a computer storage medium, configured to store a computer software instruction used by the portable electronic device in the fifth aspect, where the computer storage medium includes a program designed for executing the foregoing aspect.

BRIEF DESCRIPTION OF DRAWINGS

FIG. 9 to FIG. 12A and FIG. 12B are flowcharts of positioning methods according to embodiments of this application;

DESCRIPTION OF EMBODIMENTS

To make the objectives, technical solutions, and advantages of this application more understandable, the following provides detailed descriptions. The detailed descriptions provide various implementations of an apparatus and/or a method by using block diagrams, flowcharts, and/or examples. These block diagrams, flowcharts, and/or examples include one or more functions and/or operations. Persons in the art may understand that each function and/or operation in the block diagrams, the flowcharts, and/or the examples can be performed independently and/or jointly by using various types of hardware, software, and firmware, and/or any combination thereof.

The following describes a wireless positioning system to which embodiments of this application may be applied to.

Figure 1:
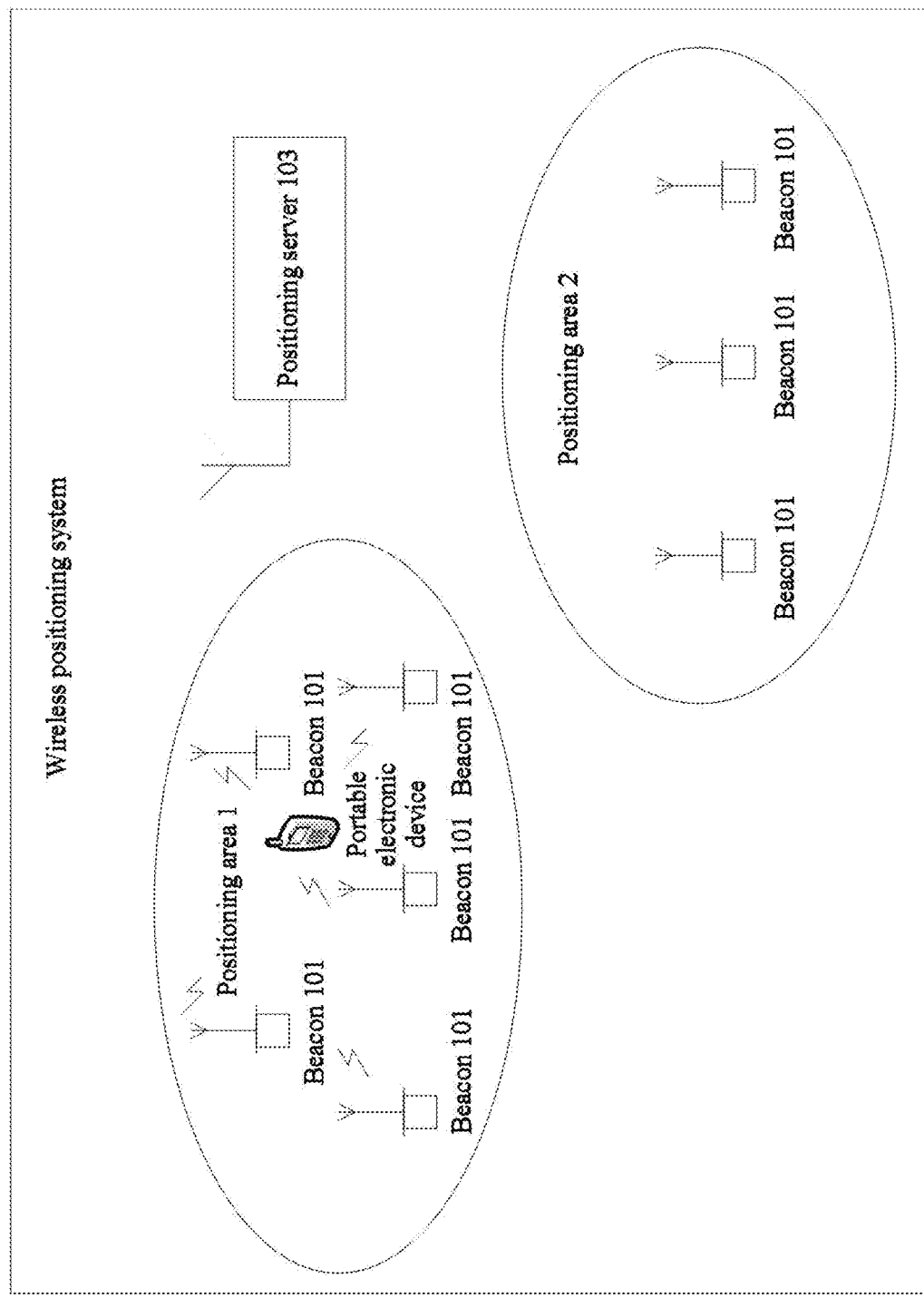
FIG. 1 is a schematic diagram of a wireless positioning system according to an embodiment of this application.

The embodiments of this application may be applied to a wireless positioning system shown in FIG. 1. As shown in FIG. 1, the wireless positioning system may include one or more positioning areas (for example, a positioning area 1 and a positioning area 2 in FIG. 1). Multiple beacons 101 are deployed in each positioning area. These beacons 101 periodically send beacon signals, and the beacon signals may be sent in a broadcast manner.

The wireless positioning system further includes at least one portable electronic device 102. For simplified illustration, only one portable electronic device 102 is shown in the figure. Generally, the portable electronic device 102 receives beacon signals from multiple beacons 101 in the positioning area, and the portable electronic device 102 obtains received signal strength of a beacon signal received from each beacon 101.

In an optional implementation, the portable electronic device 102 may perform positioning calculation, to obtain a positioning result. It should be understood that the portable electronic device 102 obtains, from a positioning server 103 or another server, location information of the positioning area (including the positioning area 1 and the positioning area 2), location information of all beacons 101, and the like, so that after performing calculation according to received RSSIs of the multiple beacons 101 by using a positioning algorithm, the portable electronic device 102 determines a positioning location with reference to the information obtained from the positioning server 103 or the another server.

In another optional implementation, the wireless positioning system may further include a positioning server 103. The portable electronic device 102 may send information about the received signal strength of the signal received from each beacon 101 to the positioning server 103. The positioning server 103 performs positioning calculation, and sends a positioning result obtained by performing the positioning calculation to the portable electronic device 102. In some embodiments, the positioning server may further determine a scan interval.

The beacon 101 is any device that can send a radio signal. For example, the beacon 101 may be a Bluetooth beacon, a Zigbee beacon, a near field communication (Near Field Communication, NFC) beacon, an infrared beacon, or the like.

Alternatively, the beacon 101 may be a base station in a mobile communications system. A communications standard of the mobile communications system includes but is not limited to Global system for mobile communications (Global System of Mobile communication, GSM), Code Division Multiple Access (Code Division Multiple Access, CDMA) IS-95, Code Division Multiple Access (Code Division Multiple Access, CDMA) 2000, Time Division-Synchronous Code Division Multiple Access (Time Division-Synchronous Code Division Multiple Access, TD-SCDMA), Wideband Code Division Multiple Access (Wideband Code Division Multiple Access, WCDMA), Time Division Duplexing-Long Term Evolution (Time Division Duplexing-Long Term Evolution, TDD LTE), Frequency Division-Duplexing-Long Term Evolution (Frequency Division-Duplexing-Long Term Evolution, FDD LTE), Long Term Evolution-Advanced (Long Term Evolution-advanced, LTE-advanced), personal handy phone system (Personal Handy-phone System, PHS), Worldwide Interoperability for Microwave Access (Worldwide Interoperability for Microwave Access, WiMAX), or the like.

The portable electronic device 102 should support a communications standard of the beacon 101, that is, the portable electronic device 102 can use a communications standard used by the beacon 101 to receive a beacon signal transmitted by the beacon 101.

The portable electronic device 102 may be a wireless terminal. The wireless terminal may be a device that provides voice and/or data connectivity for a user, a handheld device with a wireless connection function, or another processing device connected to a wireless modem. The wireless terminal may be a mobile terminal, such as a mobile phone (or referred to as a "cellular" phone) or a computer with a mobile terminal; for example, the wireless terminal may be a portable, pocket-sized, handheld, computer built-in, or in-vehicle mobile apparatus.

The beacon signal may be a pilot signal, a reference signal, or the like that is sent by the beacon 101, provided that the portable electronic device 102 can perform positioning according to the received signal.

Figure 2:
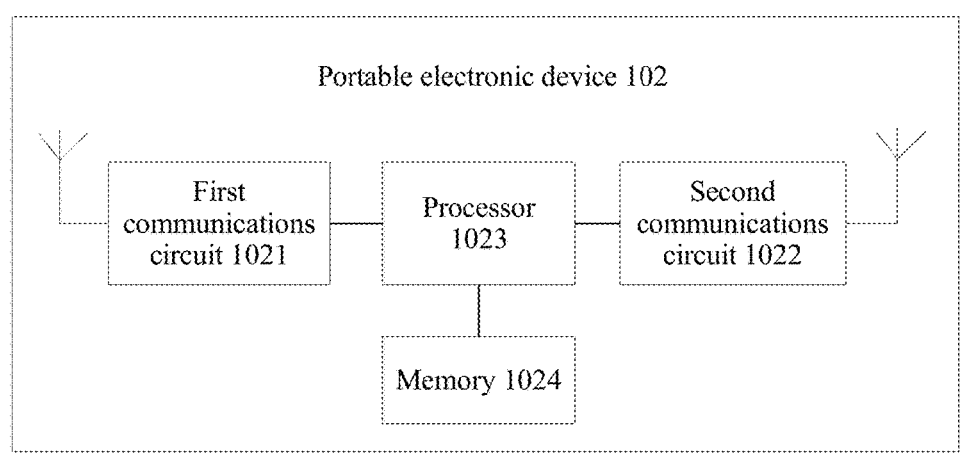
FIG. 2 shows an optional hardware structure of a portable electronic device.

For an optional implementation of the portable electronic device 102, refer to FIG. 2. As shown in FIG. 2, the portable electronic device 102 may include a first communications circuit 1021, a processor 1023, and a memory 1024, and optionally, may further include a second communications circuit 1022.

The portable electronic device 102 may further include a display, an audio frequency circuit, and a microphone, a loudspeaker, an external device interface (for example, a USB interface), a camera, and the like that are connected to the portable electronic device 102.

The portable electronic device 102 may further include one or more of an acceleration sensor, a gyroscope, a geomagnetic sensor, or other sensors of various types, and the sensor may be configured to calculate a movement speed of the portable electronic device 102 in some embodiments.

The processor 1023 may implement processing and control functions, and controls another component in the portable electronic device 102. The processor 1023 may call a program in the memory 1024, so as to control an operation of the another component. The processor 1023 may include one or more general purpose processors, and may further include one or more digital signal processors (Digital Signal Processor, DSP). The processor 1023 may complete operations such as determining a broadcast period of a beacon signal, determining a scan interval, positioning calculation, and determining an average quantity of scans in the embodiments of this application.

The memory 1024 may be configured to store a program, and the stored program may be used to control each component of the portable electronic device 102. In addition, the memory 1024 may store intermediate variables and data and the like generated during running of the processor 1023.

The first communications circuit 1021 is configured to communicate with the beacon 101 in the wireless positioning system shown in FIG. 1, to receive a beacon signal from the beacon 101. The processor 1023 processes the beacon signal received by the first communications circuit 1021, to obtain received signal strength of the beacon signal, and can recognize a beacon 101 from which the beacon signal comes.

Generally, a beacon signal includes identification information of a beacon that transmits the beacon signal. For example, by using the Bluetooth positioning system as an example, the beacon signal includes the following information:

a universal unique identifier (Universal Unique IDentifier, UUID) field whose length is 128 bits (bit);

a major (major) field whose length is 16 bits; and a minor (minor) field whose length is 16 bits.

The beacon identifies the beacon by using the three fields. For beacon signals transmitted by different beacons, combinations of the three fields are different.

For example, a positioning area is an area A on a floor of a shopping mall.

In deployment of the wireless positioning system, UUIDs may be used to distinguish between different shopping malls, that is, different shopping malls have different UUIDs; majors are used to distinguish between different floors in a shopping mall, that is, in the shopping mall, different beacons deployed on different floors have a same UUID, but have different majors; and minors are used to distinguish between different groups areas on a same floor, that is, different beacons deployed on the same floors of a shopping mall have a same UUID and major, but have different minors.

It should be noted that no limitation is imposed on specific definitions of the three fields: UUID, major, and minor (for example, UUIDs are used to distinguish between different shopping malls), and the three fields may be flexibly used according to an actual situation in system deployment.

Generally, when the portable electronic device receives the beacon signals from the multiple beacons, the portable electronic device may separate, according to identification information included in the beacon signals, the received multiple beacon signals to obtain beacon signals transmitted by different beacons.

Specifically, with reference to the implementation shown in FIG. 2, the first communications circuit 1021 in the portable electronic device 102 receives beacon signals from different beacons 101, the first communications circuit 1021 sends the received multiple beacon signals to the processor 1023, and the processor 1023 obtains identification information of the beacons 101, so as to separate the multiple beacon signals.

If the portable electronic device 102 performs the positioning calculation, with reference to the implementation shown in FIG. 2, the first communications circuit 1021 sends the received beacon signal to the processor 1023, and the processor 1023 measures received signal strength of the beacon signal, or the first communications circuit 1021 has a signal processing function, and measures received signal strength of the beacon signal. The processor 1023 performs the positioning calculation according to a measurement result.

If the wireless positioning system shown in FIG. 1 further includes the positioning server 103, the positioning server 103 may complete the positioning calculation. In this case, the portable electronic device 102 may further include the second communications circuit 1022 that is configured to communicate with the positioning server 103.

The portable electronic device 102 measures the received beacon signal to obtain the received signal strength of the beacon signal, and learns a beacon 101 from which the beacon signal comes. The portable electronic device 102 sends, to the positioning server 103 by using the second communications circuit 1022, information about the received signal strength of the beacon signal and identification information of the beacon 101 from which the beacon signal comes (the identification information may be the same as or different from identification information included in the beacon signal, provided that the identification information can identify different beacons 101 between the positioning server 103 and the portable electronic device 102). Optionally, when sending the information about the received signal strength to the positioning server 103, the portable electronic device may further indicate a scan interval in which the information about the received signal strength is obtained.

The audio frequency circuit, the loudspeaker, and the microphone may provide an audio interface between a user and the portable electronic device 102.

The display is configured to display image data generated by the processor 1023, and may have a touch function. In this case, the display is a touch display.

For a communications standard that can be used for a communication between the second communications circuit 1022 and the positioning server 103, refer to the communications standard for a communication between the portable electronic device 102 and the beacon 101. Details are not described herein again.

In this embodiment of this application, positioning calculation may be performed in the follower manner.

Generally, in a wireless positioning system, a beacon periodically broadcasts a beacon signal, for example, the beacon sends a beacon signal in a broadcast period of 200 milliseconds (ms).

The portable electronic device performs a positioning scan at a specific scan interval (scan interval), and receives a beacon signal in a positioning scan process. The portable electronic device performs positioning calculation once when performing a positioning scan, to obtain a positioning location, that is, a current location of the portable electronic device.

In a positioning calculation process, the portable electronic device obtains a current location according to received signal strength of different beacon signals sent by different beacons in a scan interval.

For example, in the Bluetooth positioning system, the portable electronic device performs the positioning calculation according to a received signal strength indicator (Received Signal Strength Indicator, RSSI) of a beacon signal transmitted by each beacon. For another wireless positioning system, another method may be used for indicating received signal strength, and this is not limited to an RSSI. Herein, the Bluetooth positioning system is as an example for description.

Figure 3:
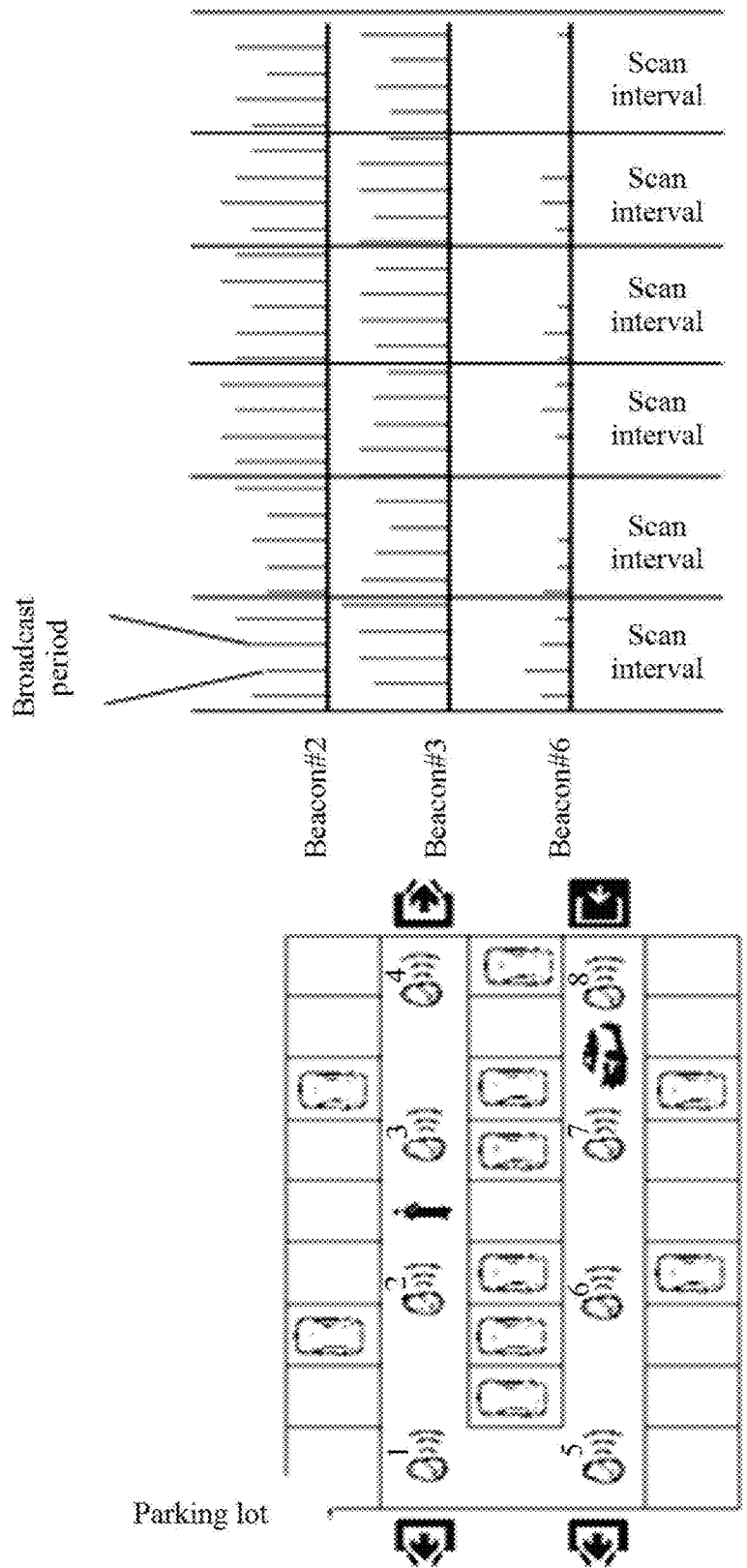
FIG. 3 is a schematic diagram of a Bluetooth positioning system.

FIG. 3 shows a Bluetooth positioning system. The Bluetooth positioning system is deployed in a garage, and FIG. 3 shows a positioning area in the Bluetooth positioning system.

A total of eight beacons are deployed in the positioning area, and serial numbers of the eight beacons are from 1 to 8. These beacons may be the beacon 101 in FIG. 1.

In FIG. 3, a user who holds a portable electronic device is closest to a beacon#2, a beacon#3, and a beacon#6 in terms of a linear distance. The beacon#2 and the beacon#3 are in a same lane as the user, and there is no obstruction in between; and a car stays between the beacon#6 and the user as an obstruction.

The portable electronic device performs multiple positioning scans by using a scan interval as an interval. In different scan intervals, signals from all of the three beacons may be received, and RSSIs of beacon signals from the beacon#2 and the beacon#3 are greater than that of a beacon signal from the beacon#6.

In FIG. 3, received signal strength of a beacon signal received from each beacon by the portable electronic device is shown on the right. A longer vertical bar indicates higher strength of a beacon signal received by the portable electronic device. It can be learned from FIG. 3 that each beacon sends a beacon signal in a broadcast period. When a ratio of a scan interval to a broadcast period of a beacon signal is greater than 2, the portable electronic device receives multiple beacon signals from a same beacon in one scan interval.

When performing positioning calculation, for a scan interval, the portable electronic device may average received signal strength values of received multiple beacon signals from one beacon, to obtain an average value of received signal strength in the scan interval; and then compares average values of received signal strength of multiple beacons, and uses a location of a beacon corresponding to a largest value as a location of the portable electronic device in the scan interval.

Alternatively, the portable electronic device compares received signal strength of all beacon signals obtained in a scan interval, to obtain largest received signal strength, and uses a location of a beacon corresponding to a beacon signal whose received signal strength is largest as a location of the portable electronic device in the scan interval.

For example, for the positioning scan process shown in FIG. 3, the portable electronic device determines, in a positioning scan process, that a location of the portable electronic device is a location of the beacon#2. Herein, the positioning location may be denoted as "2", that is, a location of a beacon whose serial number is 2.

The following explains concepts such as positioning precision, a scan packet loss rate, and a scan interval that are used in this embodiment of this application. It should be noted that these explanations are intended to facilitate understanding of this application, and should not be regarded as a limitation on the protection scope of this application.

1. Positioning Precision and Scan Packet Loss Rate

The positioning precision is used for measuring positioning precision of the portable electronic device. In a case in which beacons run in a mutually independent manner, there is no connection between the beacons, and a collaboration mechanism cannot be used (for example, in the Bluetooth positioning system, interference collaboration between beacons generally cannot be performed), beacon signals sent by different beacons are mutually interfered with, and consequently, the portable electronic device cannot correctly receive a beacon signal. Such a phenomenon is referred to as a "packet loss".

Generally, a packet loss of a beacon signal sent by a beacon closest to a location of the portable electronic device has greatest impact on the positioning precision. In a positioning scan process, if packet losses occur in all beacon signals sent by a closest beacon, a positioning error is definitely increased. Herein, a probability that packet losses occur in all the beacon signals sent by the closest beacon in the positioning scan process is referred to as a scan packet loss rate. A higher scan packet loss rate indicates lower positioning precision.

Therefore, the positioning precision may be effectively improved by reducing the scan packet loss rate.

2. Factors Affecting the Scan Packet Loss Rate (1) Scan Interval

It is found by an applicant through a large quantity of researches and experiments that a scan interval affects the scan packet loss rate. Generally, a longer scan interval indicates a lower scan packet loss rate.

For clarity of description, a beacon signal transmitted by the beacon closest to the portable electronic device is referred to as a "target signal".

In a positioning scan process, generally, the portable electronic device receives multiple target signals, and a packet loss is caused in the positioning scan process only when packet losses occur in all the target signals in the positioning scan process.

It is assumed that a probability of a packet loss caused by interference is constant, and each packet loss event is mutually independent. When a broadcast period of a beacon signal is constant, a longer scan interval indicates that the portable electronic device can theoretically receive more target signals in a positioning scan process, so that a probability of a packet loss in the positioning scan process caused by packet losses of all target signals in the positioning scan process is lower.

It can be learned that the scan interval, that is, s times of the broadcast period of the beacon signal is a factor that determines the scan packet loss rate P_loss. Generally, in system deployment, a value of s is a positive integer, but the value of s may also be set to a non-integer such as 2.5 and 3.5.

It is assumed that a broadcast period of a beacon signal in a positioning area is T_broadcast=200 ms, and a probability of a packet loss per time of a target signal is p (0<P<1).

If a scan interval is T_scan=200 ms, that is, s=1, in a positioning scan process, theoretically, the portable electronic device can receive only a maximum of one target signal, and P_loss=P.

If a scan interval is T_scan=800 ms, that is, s=4, in a positioning scan process, theoretically, the portable electronic device can receive a maximum of four target signals, and P_loss=$P^4$. The scan packet loss rate is much lower than that when s=1.

(2) Quantity of Frequency Channel Numbers that can be Used During Beacon Signal Transmission Intra-frequency interference causes a packet loss of a beacon signal. The Bluetooth positioning system is used as an example. The system uses an Industrial Scientific & Medical (Industrial Scientific Medical, ISM) frequency band of 2.4 GHz, and the frequency band is a frequency band that can be free used by the public. Wireless short-range communications systems such as Wireless Fidelity (Wireless Fidellity, WiFi) and Zigbee use the ISM frequency band of 2.4 GHz, and therefore intra-frequency interference may be imposed on beacon signals.

The Bluetooth positioning system is stilled used as an example. If three frequency channel numbers 2402 MHz, 2426 MHz, and 2480 MHz can be used during beacon signal transmission, each beacon in the system sends a beacon signal on the three frequency channel numbers in turn. It is assumed that probabilities of intra-frequency interference imposed on the three frequency channel numbers are equal and mutually independent, and the probabilities are set to $P_0$.

If s=1, a scan packet loss rate caused by intra-frequency interference is: P_loss=$P_0$;

if s=2, the portable electronic device receives beacon signals on two frequency channel numbers, and P_loss=$P_{02}$;

if s=3, P_loss=$P_{03}$.

When s>3, the portable electronic device receives beacon signals on all of the three frequency channel numbers in turn, and the scan packet loss rate P_loss is close to $P_{03}$, and is not significantly decreased with an increase of the value of s.

It can be learned that s=3 is an inflection point for a scan packet loss rate curve. Attenuation of the scan packet loss rate P_loss accelerates with the increase of s when s<3; and an attenuation of the scan packet loss rate P_loss slows down with the increase of s when s>3.

Figure 4A:
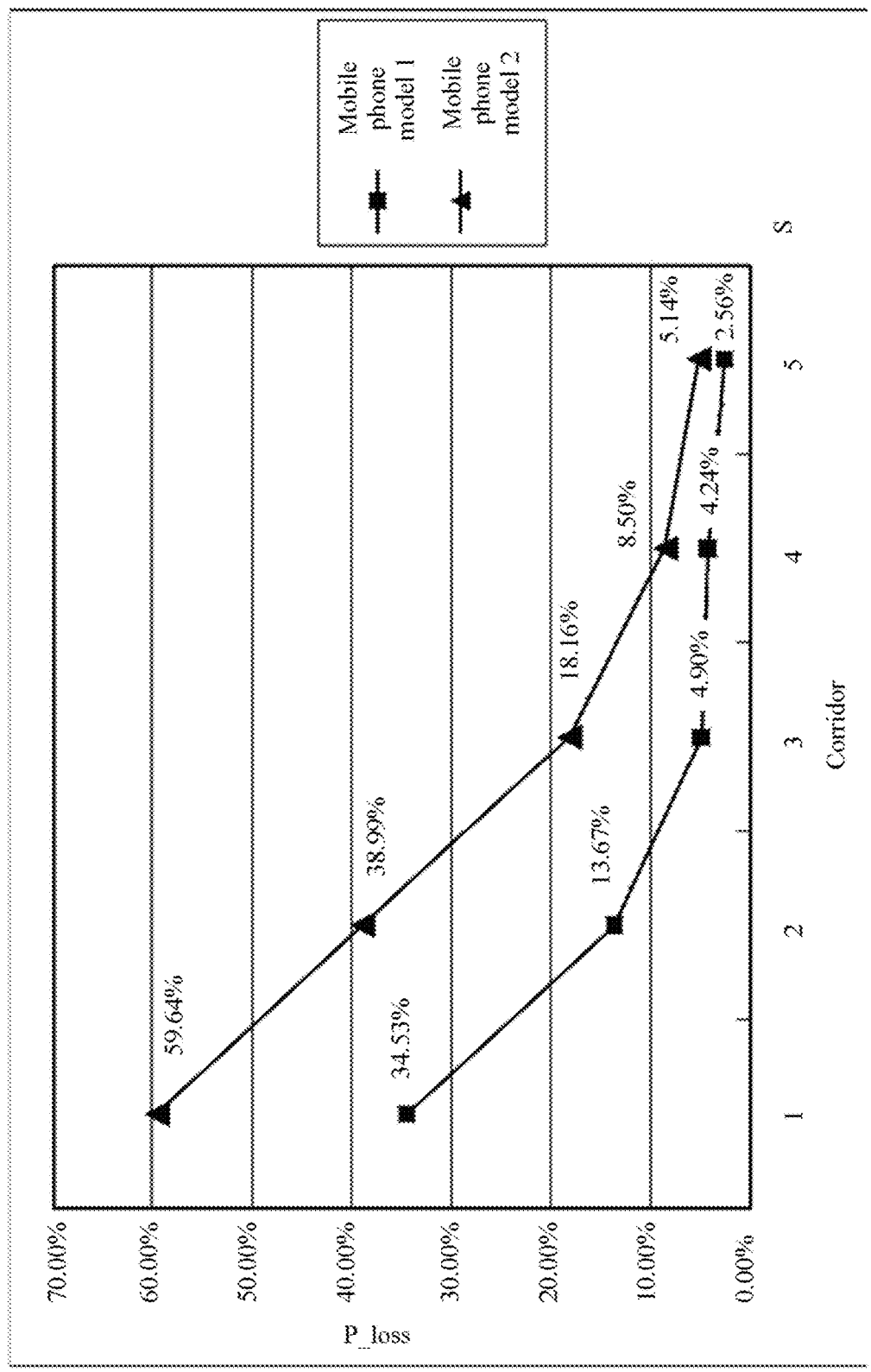
FIG. 4A and FIG. 4B are line graphs of scan packet loss rates.
Figure 4B:
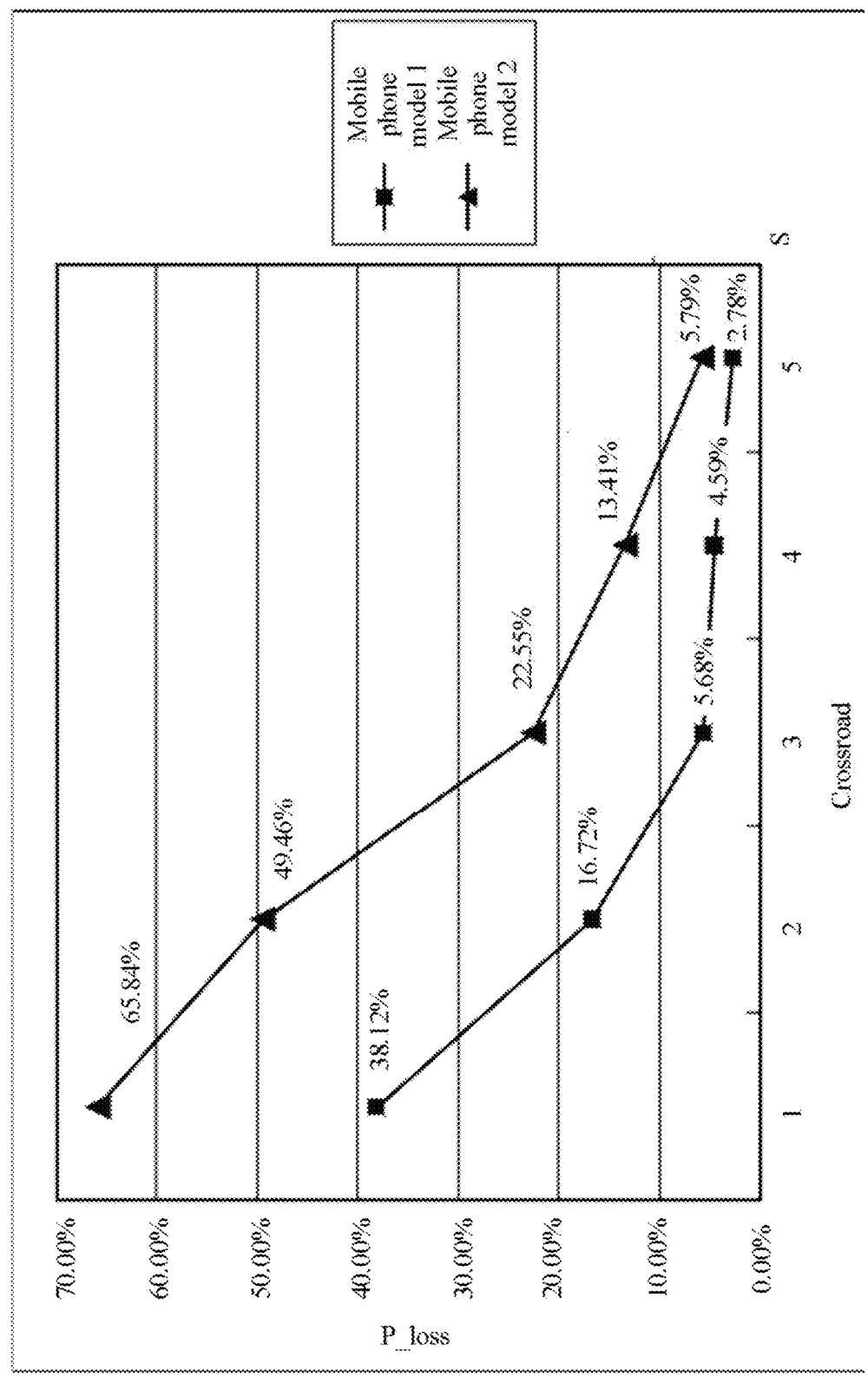

FIG. 4A shows scan packet loss rate curves of two mobile phones of different models (a mobile phone model 1 and a mobile phone model 2) in an indoor corridor. FIG. 4B shows scan packet loss rate curves of the two mobile phones of different models at a crossroad. In the two figures, a horizontal coordinate is s, and a vertical coordinate is a scan packet loss rate P_loss.

It can be learned from FIG. 4A and FIG. 4B that regardless of the mobile phone models and the positioning areas, although specific values of the scan packet loss rates are not the same, tendencies of the curves are consistent, that is, attenuation of the scan packet loss rate P_loss accelerates with an increase of s when s<3, an attenuation slows down when s>3, and s=3 is inflection points of the scan packet loss rate curves.

Similarly, if a quantity of frequency channel numbers that can be used during beacon signal transmission is four, the inflection point of the curve may appear at a point where s=4. Attenuation of a scan packet loss rate P_loss accelerates with an increase of s when s<4, and an attenuation slows down when s>4.

It can be learned from the two factors affecting the scan packet loss rate, that is, the scan interval and the quantity of frequency channel numbers that can be used during beacon signal transmission, that when the broadcast period of the beacon signal is constant, a longer scan interval indicates a lower scan packet loss rate. However, when s is greater than the quantity of frequency channel numbers that can be used during beacon signal transmission, a decrease of the scan packet loss rate greatly slows down.

3. Positioning Precision and Scan Interval

As described above, a longer scan interval indicates a lower scan packet loss rate. However, a longer scan interval is not always better. The portable electronic device often moves. Therefore, a longer scan interval indicates that the portable electronic device moves farther in a scan interval. The portable electronic device may pass through multiple beacons in the scan interval, positioning ambiguity is larger, and positioning precision is lower.

In addition, a longer scan interval indicates a higher delay in positioning location update and worse user experience.

In this embodiment of this application, the positioning precision is improved by adjusting the scan interval. To reduce the scan packet loss rate, further, positioning ambiguity needs to be avoided as much as possible. An appropriate scan interval is set, so as to ensure an appropriate delay in positioning location update, and provide favorable user experience.

In the following description, a portable electronic device may be the portable electronic device 102 in FIG. 1, a beacon may be the beacon 101 in FIG. 1, and a positioning server may be the positioning server 103 in FIG. 1.

As described above, the scan packet loss rate is related to the value of s, and s is a ratio of the scan interval to the broadcast period of a beacon signal. Therefore, the broadcast period of the beacon signal needs to be learned before setting an appropriate scan interval.

In addition, the positioning ambiguity and a positioning delay are related to a movement speed of the portable electronic device and beacon deployment density. In a positioning area, generally, the beacon deployment density is determined. Therefore, to improve the positioning precision, the movement speed of the portable electronic device may need to be considered.

In some embodiments of this application, the scan interval is adjusted by measuring the movement speed of the portable electronic device in the following Manner 1.

Manner 1:

An average quantity of scans is determined according to a positioning result obtained in at least one scan interval, and the at least one scan interval is a statistical interval. The average quantity of scans is an average value of quantities of continuous appearance times of different positioning locations in a positioning result obtained in the statistical interval, and is used to represent a quantity of appearance times of a same positioning location. A larger average quantity of scans indicates that a movement speed of the portable electronic device is lower, and more beacon signals from a same beacon are received by the portable electronic device; and a smaller average quantity of scans indicates that the movement speed of the portable electronic device is higher, and fewer beacon signals from a same beacon are received by the portable electronic device. The movement speed of the portable electronic device may be measured by determining the average quantity of scans.

However, in other embodiments, the following Manner 2 is adopted.

Manner 2:

The movement speed of the portable electronic device is detected, and the scan interval is adjusted according to the detected movement speed.

The following separately describes the two manners.

Manner 1

Figure 5A:
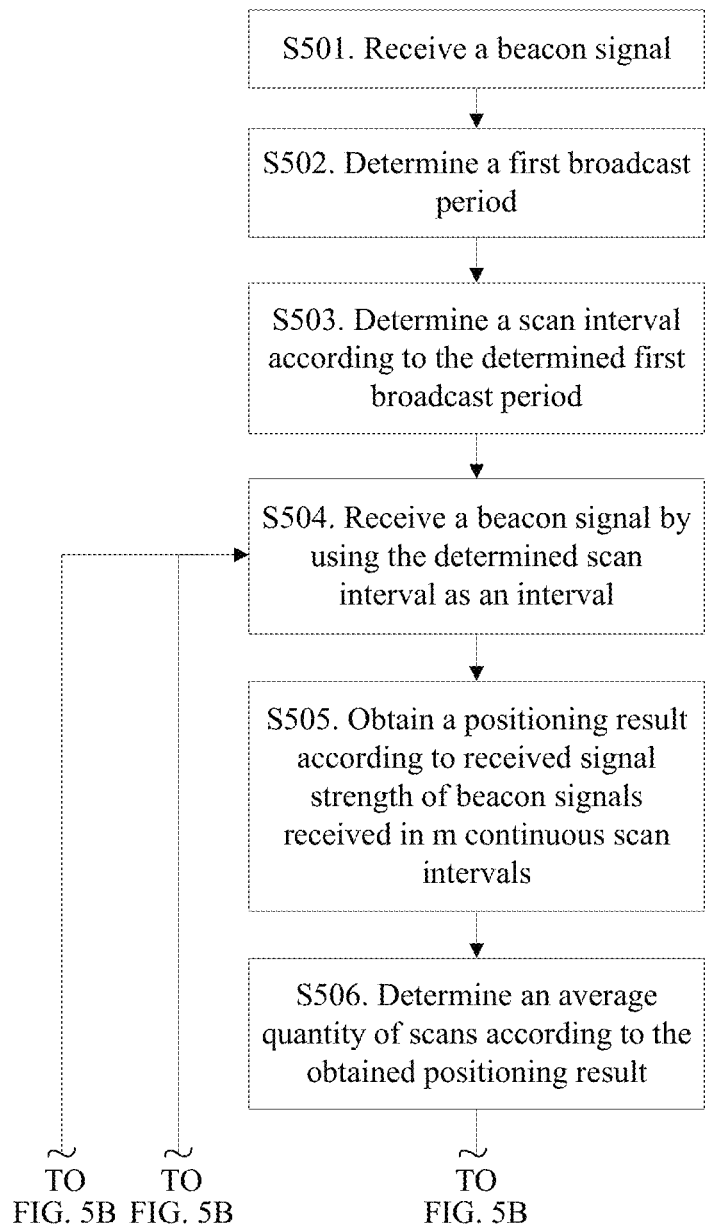
FIG. 5A and FIG. 5B are a flowchart of a method in which a portable electronic device adjusts a scan interval to perform positioning according to an embodiment of this application.
Figure 5B:
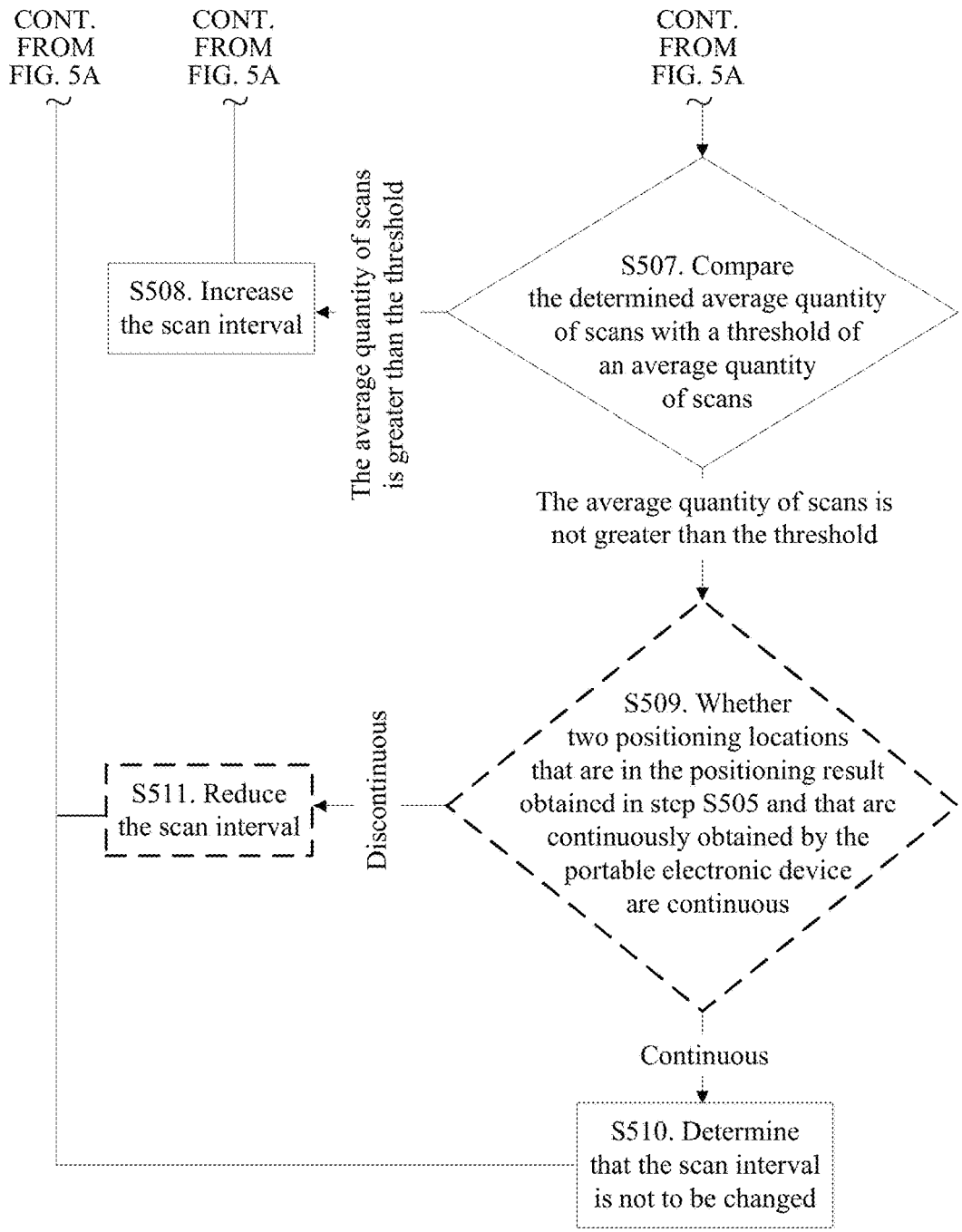

FIG. 5A and FIG. 5B show a procedure of a method in which a portable electronic device adjusts a scan interval to perform positioning in Manner 1. The procedure may be executed by the portable electronic device. As shown in FIG. 5A and FIG. 5B, the following steps are included.

S501. Receive a beacon signal.

S502. Determine a broadcast period of a beacon signal in a positioning area according to the received beacon signal, where the broadcast period is denoted as a first broadcast period.

S503. Determine a scan interval according to the determined first broadcast period, where an initial scan interval is denoted as a first scan interval herein.

S504. Receive a beacon signal by using the determined scan interval as an interval.

S505. Obtain, according to received signal strength of beacon signals received in m continuous scan intervals, a positioning result that includes m positioning locations.

The $k^{th}$ positioning location in the m positioning locations is obtained according to received signal strength of a beacon signal received in the $k^{th}$ first scan interval in the m continuous first scan intervals, m is a preset integer greater than 1, and k is an integer greater than 1 and not greater than m.

S506. Determine an average quantity of scans according to the obtained positioning result.

That is, determine the average quantity of scans according to the m positioning locations.

S507. Compare the determined average quantity of scans with a preset threshold of an average quantity of scans.

If the determined average quantity of scans is greater than the threshold of the average quantity of scans, step S508 is performed; or if the determined average quantity of scans is not greater than the threshold of the average quantity of scans, step S509 is performed.

S508. Increase the scan interval, for example, increase to a second scan interval, where the second scan interval is greater than the first scan interval; and then return to step S504.

S509. Determine whether positioning locations in the positioning result obtained in step S505 by the portable electronic device during two consecutive scans are continuous; and if the positioning locations are continuous (that is, no location jump occurs), perform step S510, or if the positioning locations are discontinuous, perform step S511.

S510. Determine that the scan interval is not to be changed, and return to step S504.

S511. Reduce the scan interval, for example, reduce the scan interval to a third scan interval, and return to step S504.

Optionally, when a determining result in step S507 is that the average quantity of scans is not greater than the threshold of the average quantity of scans, step S510 may be directly performed, that is, the scan interval is not to be changed, determining in step S509 is not performed, step S511 does not exist accordingly, and this is shown by dashed lines in FIG. 5A and FIG. 5B.

In each of the foregoing steps, if the scan interval needs to be adjusted, adjustment may be performed according to a specific step. For example, the broadcast period of the beacon signal is 200 ms, and the first scan interval determined in step S503 is 600 ms, that is, s=3. A possible reason of such setting is that a quantity of frequency channel numbers that can be used for a beacon signal is 3. A longer scan interval and a lower scan packet loss rate may be obtained by using this value of s, so as to ensure higher positioning precision.

If the scan interval is adjusted according to the step, the step may be set to an integer multiple of the broadcast period, for example, if the broadcast period of the beacon signal is 50 ms, the step may be set to 50 ms or 100 ms.

In addition, after the scan interval is determined in step S503, and a positioning scan is performed in step S504 according to the scan interval determined in step S503, after a scan interval is re-determined by performing step S508, step S510, or step S511 (determining that the scan interval is not to be changed in step S510 may also be regarded as re-determining a scan interval, but the determined scan interval is equal to the previous scan interval), a positioning scan is performed again, a new positioning result is obtained, and then the scan interval may be adjusted, so as to adjust the positioning precision in real time.

Alternatively, to simplify processing, considering that a movement speed of the portable electronic device in a positioning area does not change greatly, adjustment may not be performed in a relatively long time segment, and the positioning scan is always performed at the adjusted scan interval. For example, the positioning scan is performed at the adjusted scan interval before the portable electronic device leaves the positioning area.

During implementation, optionally, step S504 to step S511 may be circulated to obtain a relatively steady scan interval. That is, by performing the step of determining, when positioning locations obtained by the portable electronic device during two consecutive scans are continuous in a scan interval, and the scan interval keeps unchanged during a preset quantity of continuous circulations, it is determined that an optimum scan interval is obtained. In a relatively long subsequent time segment (a time length may be preset), positioning calculation may be performed at the optimum scan interval.

To obtain a scan interval in a positioning area, a broadcast period of transmitting a beacon signal by a beacon deployed in the positioning area first needs to be detected, and then the value of s is set, to obtain an appropriate scan interval.

A Bluetooth positioning system is used as an example. A broadcast period of transmitting a beacon signal by a beacon is generally set to a value ranging from 50 ms to 5 s. Beacons deployed in a same positioning area generally have a same broadcast period. In step S502, the portable electronic device determines a broadcast period of a beacon signal transmitted by each beacon in a positioning area.

In a wireless positioning system such as the Bluetooth positioning system, because an interference collaboration mechanism is not used, in a same positioning area, a beacon signal is not sent strictly according to a broadcast period, and a random value δ is added to the broadcast period that is set. Generally, the random value δ is between −10 ms and 10 ms, and is uniformly distributed, that is, δ~U [−10 ms, 10 ms]. For example, when the broadcast period is set to 200 ms, a time interval between two neighboring beacon signals is a random value between 190 ms to 210 ms. In this way, a possibility of "collision" in beacon signals may be reduced when there is no interference collaboration mechanism, so as to avoid as much as possible a case in which the "collision" always occurs in subsequent signals once the "collision" occurs in two beacon signals of a same broadcast period.

Figure 6:
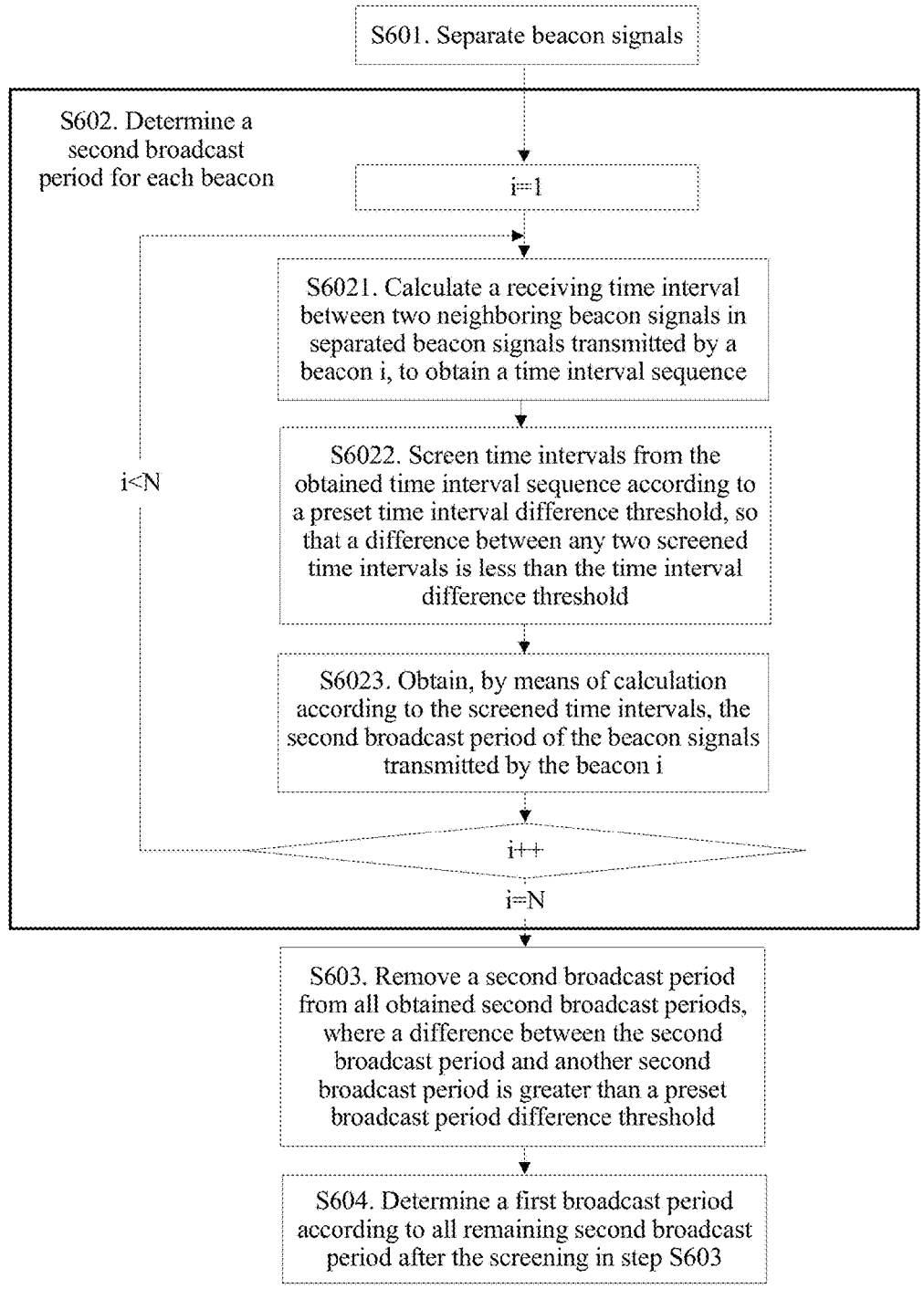
FIG. 6 is a flowchart of a method in which a portable electronic device determines a broadcast period of a beacon signal in a positioning area according to an embodiment of this application.

In step S502, the first broadcast period may be determined by using a procedure shown in FIG. 6. As shown in FIG. 6, the procedure may include the following steps.

S601. Separate received beacon signals to obtain beacon signals transmitted by different beacons, where the beacon signals received in this step may be the beacon signal received in step S501.

For example, a portable electronic device receives beacon signals sent by n beacons, and the n beacons are successively numbered as follows: i=1, . . . , n, where n is a positive integer. The portable electronic device may perform step S602 on a beacon signal sent by each beacon i, so as to determine a second broadcast period of the beacon i.

Step S602 may specifically include the following substeps.

S6021. Calculate a receiving time interval between two neighboring beacon signals in the separated beacon signals transmitted by the beacon, to obtain a time interval sequence.

S6022. Screen time intervals from the obtained time interval sequence according to a preset time interval difference threshold, so that a difference between any two screened time intervals is less than the time interval difference threshold.

S6023. Obtain, by means of calculation according to the screened time intervals, the second broadcast period of the beacon signals transmitted by the beacon.

S603. After step S602 is performed, remove a second broadcast period from n obtained second broadcast periods, where a difference between the second broadcast period and another second broadcast period is greater than a preset broadcast period difference threshold.

S604. Determine the first broadcast period according to a remaining second broadcast period obtained after the screening in step S603.

The procedure shown in FIG. 6 may be for one positioning area, so as to determine a broadcast period of transmitting a beacon signal by a beacon in the positioning area.

In step S601, the beacon signals may be separated in the manner described above for separating the beacon signal by the first communications circuit 1021 and the processor 1023. The Bluetooth positioning system shown in FIG. 3 is used as an example. When being located at a location of the user shown in FIG. 3, the portable electronic device receives beacon signals broadcast by a total of three nearby beacons. The three beacons are the beacon#2, the beacon#3, and the beacon#6.

Figure 7:
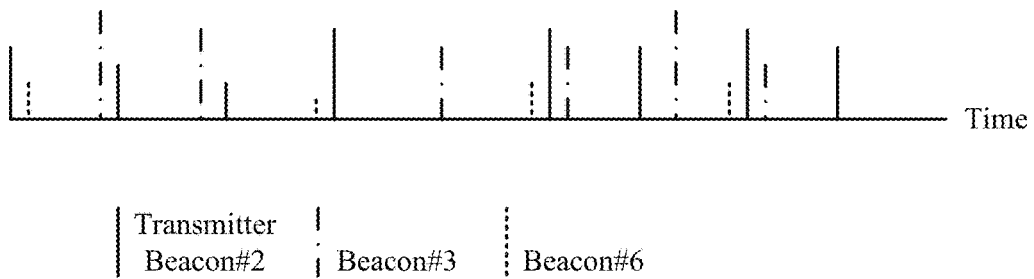
FIG. 7 is a schematic diagram of a beacon signal received by a portable electronic device according to an embodiment of this application.

The beacon signals received by the portable electronic device may be shown in FIG. 7. A lateral axis represents a time, a solid line segment represents a beacon signal received from the beacon#2 by the portable electronic device, a dash dotted line segment represents a beacon signal received from the beacon#3 by the portable electronic device, and a dashed line segment represents a beacon signal received from the beacon#6 by the portable electronic device. In addition, a length of a line segment represents received signal strength of a beacon signal received by the portable electronic device, and a longer line segment indicates higher received signal strength.

As shown in FIG. 7, the beacon signals received from the three beacons by the beacon signal are mixed together, and a beacon signal from one beacon needs to be separated from a beacon signal from another beacon. Different beacon signals include different beacon identification information. After receiving the beacon signals, the portable electronic device obtains the identification information of a beacon, and identifies different beacons according to the obtained identification information of a beacon.

In the procedure shown in FIG. 6, after substep S6021, substep S6022, and substep S6023 are performed for the beacon i, the three substeps are performed for a beacon i+1. Actually, alternatively, substep S6021 may be performed on all beacons, then substep S6022 is performed, and the like, provided that for each beacon i, a second broadcast period of the beacon i can be determined.

In substep S6021, for beacon i, a receiving time interval between two neighboring beacon signals is calculated, to obtain a time interval sequence.

The Bluetooth positioning system shown in FIG. 3 is still used as an example. After the beacon signals are separated, receiving times of all beacon signals transmitted by all beacons i are obtained, and a receiving time interval between two neighboring beacon signals is calculated according to the times, to obtain the following time interval sequence:

beacon#2: 197 ms, 205 ms, 198 ms, 387 ms, 191 ms, 206 ms, 199 ms beacon#3: 396 ms, 194 ms, 402 ms, 201 ms, 196 ms, 193 ms, 205 ms beacon#6: 411 ms, 408 ms, 593 ms, 387 ms In substep S6022, the portable electronic device may screen time intervals in the obtained time interval sequence of each beacon.

For example, a time interval difference threshold is set, and 30 ms is used as an example herein. A difference $\Delta t$ between each time interval and a previous time interval in the time interval sequence. If $\Delta t<-30$ ms, the previous time interval is deleted, and this time interval is retained; if $-30$ ms$<\Delta t\leq 30$ ms, both this time interval and the previous time interval are retained; or if $\Delta t>30$ ms, the previous time interval is retained, and this time interval is deleted.

When setting the time interval threshold, refer to the random value $\delta$ and the broadcast period. For example, if a value range of the random $\delta$ is from $-10$ ms to 10 ms, a value range of a difference between an interval between two neighboring beacon signals received from a same beacon by the portable electronic device and the broadcast period is from $-20$ ms to 20 ms, and in this case, plus a protection interval of 10 ms, the time interval threshold may be set to 30 ms. In this way, it can be ensured that the portable electronic device accurately determines whether a packet loss occurs in two received neighboring beacon signals.

After screening, a time interval 387 ms in the time interval sequence of the beacon#2 is deleted, two time intervals, 396 ms and 402 ms, in the time interval sequence of the beacon#3 are deleted, and a time interval 593 ms in the time interval sequence of the beacon#6 is deleted.

A purpose of screening is to screen out an "abnormal point" in the time interval sequence. If the difference between the two neighboring time intervals exceeds the time interval threshold, it indicates that definitely, received beacon signals corresponding to the two time intervals are not continuously received, and definitely, there is a packet loss. If a previous value is less than a current value, it indicates that a packet loss occurs in a beacon signal corresponding to a current time interval, and therefore the current time interval needs to be deleted; and on the contrary, if the previous value is greater than the current value, it indicates that a packet loss occurs in a beacon signal corresponding to a previous time interval, and therefore the previous beacon signal needs to be deleted. After screening, it is ensured that received beacon signals corresponding to all time intervals in the time interval sequence are continuous in terms of time.

In substep S6023, for each beacon, remaining time intervals in the screened time interval sequence may be averaged, to obtain the second broadcast period of the beacon signal transmitted by the beacon.

Results obtained by means of calculation are as follows: Beacon#2: 199 ms; beacon#3: 198 ms, and beacon#6: 402 ms.

In step S603, a difference between the three obtained second broadcast periods is calculated, and when the difference exceeds the preset broadcast period difference threshold, a longer second broadcast period is deleted.

In the second broadcast periods obtained by means of calculation in step S602, a difference between the second broadcast period of the beacon#6 and the second broadcast period of the beacon#2 and a difference between the second broadcast period of the beacon#6 and the second broadcast period of the beacon#3 are required to exceed the broadcast period difference threshold, for example, 100 ms, and the second broadcast period of the beacon#6 is longer. Therefore, the second broadcast period of the beacon#6 is deleted.

A reason that the second broadcast period of the beacon#6 is larger may be as follows: A distance between the beacon#6 and the portable electronic device is longer, and consequently, received signal strength of a beacon signal that is received by the portable electronic device and transmitted by the beacon#6 is much less than that of the beacon signals received from the beacon#2 and the beacon#3. Therefore, the beacon signal transmitted by the beacon#6 is more susceptible to interference, and a packet loss occurs more likely. In the foregoing example, no two consecutive beacon signals in the beacon signals transmitted by the beacon#6 are correctly received by the portable electronic device, and therefore the foregoing phenomenon occurs.

In step S604, all remaining second broadcast periods obtained after the screening in step S603 may be averaged, an obtained average value is corresponded to a closest broadcast period range, and a broadcast period of a beacon signal in the positioning area is the first broadcast period.

As described above, the broadcast period of transmitting the beacon signal by the beacon is generally set to a value ranging from 50 ms to 5 s. Generally, a configurable broadcast period is not any value in the range, but some optional values, for example, 50 ms, 100 ms, 150 ms, 200 ms, 250 ms, 300 ms, . . . , and the like. Therefore, the configurable broadcast period is divided into some ranges. In step S604, a range that is closest to the obtained average value of the second broadcast periods is 200 ms, and therefore the obtained first broadcast period is 200 ms.

As described above, the scan interval may be adjusted by measuring the movement speed of the portable electronic device in Manner 2. The average quantity of scans is determined according to the positioning result obtained in the at least one scan interval, and the average quantity of scans may be used to measure the movement speed of the portable electronic device. The following describes in detail a method for determining the average quantity of scans by the portable electronic device and then adjusting the scan interval in step S503.

As described above, the positioning ambiguity and the positioning delay are determined by two factors: the movement speed of the portable electronic device and the beacon deployment density. In a positioning area, the beacon deployment density is determined, and therefore, the movement speed of the portable electronic device actually determines the positioning ambiguity and the positioning delay in the positioning area.

The movement speed of the portable electronic device may be reflected by a rate of change in a positioning location obtained during each positioning scan. When the movement speed of the portable electronic device is low, a positioning location of the portable electronic device does not change until some positioning scans are performed; and when the movement speed of the portable electronic device is high, it is possible that a positioning location obtained during each positioning scan is different, and a jump may even occur in positioning locations obtained during two consecutive positioning scans.

The Bluetooth positioning system shown in FIG. 3 is used as an example. For example, a movement track of the portable electronic device in the positioning area shown in FIG. 3 is as follows:

beacon#4→beacon#3→beacon#2→beacon#1.

If positioning locations obtained during two consecutive positioning scans are the beacon#4 and the beacon#2 respectively, a jump occurs in the positioning locations.

The movement speed of the portable electronic device is detected, so as to avoid a positioning location jump caused by an excessively long scan interval.

The following describes a relationship between the scan interval and the positioning location by using an example.

The Bluetooth positioning system shown in FIG. 3 is still used as an example. It is assumed that a movement track of the portable electronic device in a positioning area is as follows: beacon#4→beacon#3→beacon#2→beacon#1, and the portable electronic device moves at a constant speed.

If the scan interval is 600 ms, that is, positioning calculation is performed once every 600 ms, after a positioning scan process lasts for a specific time, for example, after 7200 ms, an obtained positioning location sequence is 4, 4, 4, 3, 3, 2, 2, 2, 1, 1, 1, 1. A number indicates a serial number of a beacon.

When the scan interval is 800 ms, an interval between two times of positioning calculation is longer; and when the movement speed of the portable electronic device is not changed, in each positioning scan process, a movement distance of the portable electronic device is also longer. Therefore, a quantity, obtained by performing the positioning calculation, of locations that keep unchanged is reduced. Compared with the case in which the scan interval is 600 ms, after a positioning scan process lasts for a same time, an obtained positioning location sequence is as follows: 4, 4, 4, 3, 3, 2, 2, 1, 1.

When the scan interval is 1000 ms, and duration of a positioning scan process is not changed either, an obtained positioning location sequence is as follows: 4, 4, 3, 2, 1, 1. Herein, both a positioning location 3 and a positioning location 2 appear only once, and it indicates that after only one scan, the positioning location jumps from 3 to 2, and then jumps from 2 to 1, but these are still continuous location jumps.

If the scan interval continues to increase, a discontinuous location jump occurs, for example, a jump from 4 to 2, or a jump from 3 to 1.

It is assumed that the scan interval determined in step S502 is x times as long as the first broadcast period, and x is a quantity of frequency channel numbers that can be used during beacon signal transmission in the positioning area. As described above, s=x is an inflection point of a scan packet loss rate curve. Therefore, in step S502, it is better to set the initial value of the scan interval to x, so that a process of adjusting the scan interval is not excessively long, and a more accurate positioning result may be easily obtained.

Optionally, if x=3, the initial value of the scan interval is set to three times of the first broadcast period.

In step S504, the portable electronic device receives the beacon signal, and performs the positioning calculation according to the scan interval that is set. For example, after the initial value of the scan interval is set, a positioning scan is performed according to the initial value, to obtain a positioning location sequence in at least one scan interval, and statistics collection is performed on positioning locations.

A value of a statistical period may be determined according to a size of the positioning area, a requirement for the positioning precision, and a requirement for the positioning delay. A larger positioning area indicates that the statistical period may be set to a larger value, so as to obtain a more accurate positioning result; a higher requirement for the positioning precision indicates that the statistical period may also be set to a larger value; and a higher requirement for the positioning delay indicates that the statistical period needs to be set to a smaller value. The statistical period may be set according to a specific requirement of an engineering practice.

Optionally, the statistical period may be an integer multiple of the scan interval, such as 12; or the statistical period may be a non-integer multiple of the scan interval, such as 8.3 times.

The average quantity of scans is an average quantity of appearance times of positioning locations that are based on each beacon and in the positioning location sequence obtained in the statistical period, that is, the at least one scan interval.

If the scan interval is set according to a fact that s=3, the first broadcast period is 200 ms, the scan interval is 600 ms, and the statistical period is 7200 ms, a positioning location sequence obtained in the statistical period is as follows:

4, 4, 4, 3, 3, 2, 2, 2, 1, 1

Three scans are performed at the positioning location 4, two scans are performed at the positioning location 3, three scans are performed at the positioning location 2, and two scans are performed at the positioning location 1. An obtained average quantity of scans is: (3+2+3+2)/4=2.5.

Sometimes, a user walks back and forth in a positioning area, and in this case, a same positioning location appears repeatedly and discontinuously. For example, an obtained positioning location sequence in positioning location sequences obtained in the statistical period, that is, the at least one scan interval is as follows:

4, 4, 4, 3, 3, 2, 2, 2, 3, 3, 3, 4, 4

A positioning location 4 discontinuously appears for two times, and quantities of scans are 3 and 2 respectively; a positioning location 3 also discontinuously appears for two times, and quantities of scans are 2 and 3 respectively; and three scans are performed at a positioning location 2. An obtained average quantity of scans is: (3+2+2+3+3)/5=2.6.

In step S507, the average quantity of scans is compared with the preset threshold of the average quantity of scans, and if the average quantity of scans is greater than the threshold of the average quantity of scans, step S508 is performed to increase the scan interval, so as to obtain a lower scan packet loss rate.

The threshold of the average quantity of scans may be set according to an engineering practice. The threshold of the average quantity of scans may be set to 2 according to the requirement for the positioning precision. When the average quantity of scans is greater than 2, it indicates that a current movement speed of the portable electronic device is enough to support the requirement for the positioning precision based on the scan interval; and if the average quantity of scans is changed to 1, it indicates that positioning locations obtained during all positioning scans are different, but a movement track of the portable electronic device is continuous. Once a positioning result of a positioning scan is incorrect, the movement track obtained by means of positioning becomes discontinuous, and consequently positioning experience is compromised. Therefore, relatively high positioning precision may be obtained by setting the threshold of the average quantity of scans to 2; and if the average quantity of scans is greater than 2, it indicates that the scan interval in this case is enough to obtain a steady and continuous movement track by performing the positioning calculation, and the scan interval can be further increased. In this case, the scan interval may be increased until the average quantity of scans is reduced to 2. Optionally, the scan interval may be adjusted according to fixed compensation, for example, 50 ms or 100 ms.

In step S507, if the obtained average quantity of scans is less than the threshold of the average quantity of scans, whether the positioning locations obtained by performing continuous scans are continuous is further determined in step S509, and the scan interval keeps unchanged if the positioning locations are continuous, otherwise, step S511 is performed to reduce the scan interval until positioning locations are continuous.

Manner 2

Figure 8:
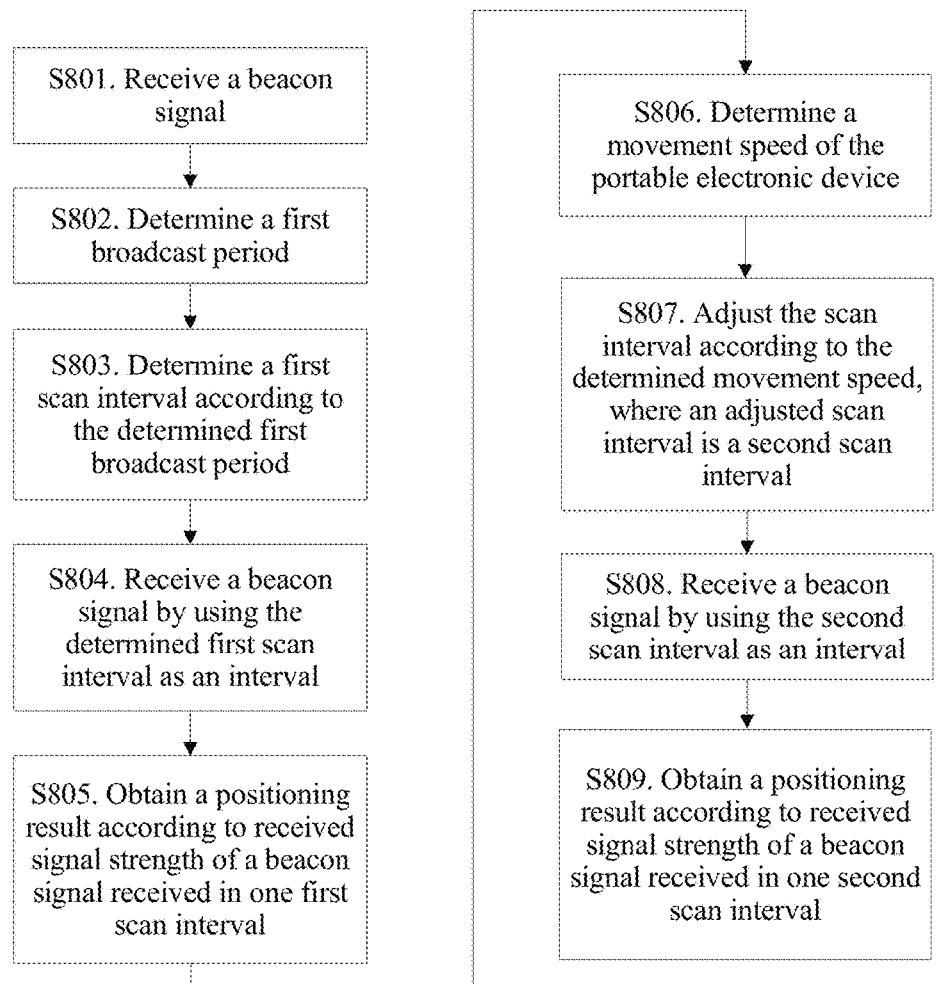
FIG. 8 is a flowchart of another method in which a portable electronic device adjusts a scan interval to perform positioning according to an embodiment of this application.

FIG. 8 shows a procedure of a method in which a portable electronic device determines a scan interval to perform positioning in Manner 2. The procedure may be executed by the portable electronic device. As shown in FIG. 8, the following steps are included.

S801. Receive a beacon signal.

S802. Determine a broadcast period of a beacon signal in a positioning area according to the received beacon signal, where the broadcast period is denoted as a first broadcast period.

S803. Determine a scan interval according to the determined first broadcast period, where the scan interval is denoted as a first scan interval.

S804. Receive a beacon signal by using the determined first scan interval as an interval.

S805. Obtain a positioning result according to received signal strength of a beacon signal received in one first scan interval.

S806. Determine a movement speed of the portable electronic device.

S807. Adjust the scan interval according to the determined movement speed, where an adjusted scan interval is denoted as a "second scan interval".

For example, the first scan interval is adjusted according to a correspondence between a movement speed and a second scan interval, to obtain the second scan interval. Optionally, the first scan interval and the second scan interval are not equal.

Optionally, a relationship between a movement speed and an optimum scan interval may be pre-obtained by means of measurement, so as to determine an optimum scan interval corresponding to a most accurate positioning result based on a specific movement speed. Alternatively, an optimum scan interval is determined for a specific movement speed range. In step S807, when the movement speed is determined, the optimum scan interval may be determined as the second scan interval according to the preset correspondence between a movement speed and an optimum scan interval.

S808. Receive a beacon signal by using the second scan interval as an interval.

S809. Obtain a positioning result according to received signal strength of a beacon signal received in one second scan interval.

Step S806 can be performed not only after step S805, but also at any moment before step S807. Certainly, because in step S807, the scan interval needs to be determined according to the movement speed of the portable electronic device, if an interval between a time at which the step S806 is performed and a time at which the step S807 is performed is shorter, a more accurate scan interval is determined in step S807.

In step S807, an optional implementation is: The movement speed determined in step S806 is compared with a preset movement speed threshold; if the determined movement speed is lower than the movement speed threshold, the scan interval is increased, for example, to the second scan interval, where the second scan interval is greater than the first scan interval; or if the determined movement speed is not lower than the movement speed threshold, or the first scan interval is not changed.

The steps in which the scan interval is adjusted according to the movement speed may be circulated, so as to obtain a relatively steady scan interval. If the scan interval keeps unchanged in preset times of continuous circulation, it is determined that an optimum scan interval is obtained. In a relatively long subsequent time segment (the time length may be preset), positioning calculation may be performed at the optimum scan interval.

In step S807, another optional implementation is: The adjusted scan interval is obtained by means of calculation according to the movement speed determined in step S806.

For example, if a distance between two beacons in a positioning area is d, the portable electronic device may obtain a value of d from a broadcast message sent by the beacon. The movement speed determined in step S806 is v.

The adjusted scan interval T_scan should meet the following condition:

$(d/v)/T\_scan \geq 2$.

Herein, a value 2 is a preset threshold. For a rule of setting the preset threshold, refer to that of setting the threshold of the average quantity of scans in Manner 1. A purpose is to ensure continuous positioning locations and relatively high positioning precision.

In addition, considering a relationship between the scan packet loss rate and the value of s, when the condition $(d/v)/T\_scan \geq 2$ is met, if T_scan is less than x times of the first broadcast period, where x is a quantity of frequency channel numbers that can be used for transmitting the beacon signal by the beacon in the positioning area, T_scan may be appropriately increased, so as to reduce the scan packet loss rate, and further improve the positioning precision.

Optionally, for a positioning area, a corresponding list of a movement speed of the portable electronic device and a scan interval may be obtained by performing pre-testing, and the scan interval may be obtained by querying the corresponding list.

For step S801 to step S805, refer to step S501 to step S505 respectively.

In step S806, there are multiple methods for calculating the movement speed of the portable electronic device, for example, performing calculation by using a Bluetooth signal or by using a sensor. For a manner in which the Bluetooth signal is used to measure the movement speed, refer to the manner for determining the average quantity of scans. In a manner in which the movement speed is calculated by using the sensor, a sensor configured for the portable electronic device, such as an acceleration sensor, a gyroscope, and a geomagnetic sensor, is used to calculate the movement speed. Generally, a more accurate movement speed may be obtained with a lower delay in the manner in which the movement speed is calculated by using the sensor, but a movement speed calculation function needs to be added. For another example, the portable electronic device may determine the movement speed of the portable electronic device according to at least two positioning locations obtained in a positioning process. The portable electronic device may pre-learn a distance between positioning locations respectively corresponding to two beacons deployed in a positioning area, and then may estimate the movement speed of the portable electronic device according to an interval between times at which the positioning locations corresponding to the two beacons are obtained respectively. In specific implementation, a location where a beacon is at sometimes is not the same as a positioning location corresponding to the beacon, and in this case, the movement speed of the portable electronic device should be calculated according to a distance between positioning locations respectively corresponding to two beacons.

For implementation of step S808 and step S809, refer to step S804 and step S805 respectively. A difference is that the scan interval is the second scan interval obtained after adjusting.

The following describes procedures shown in FIG. 9 to FIG. 12A and FIG. 12B from a perspective of interaction between a portable electronic device and a beacon. Procedures shown in FIG. 10A, FIG. 10B, FIG. 12A, and FIG. 12B further include interaction between a portable electronic device and a positioning server.

Figure 9:
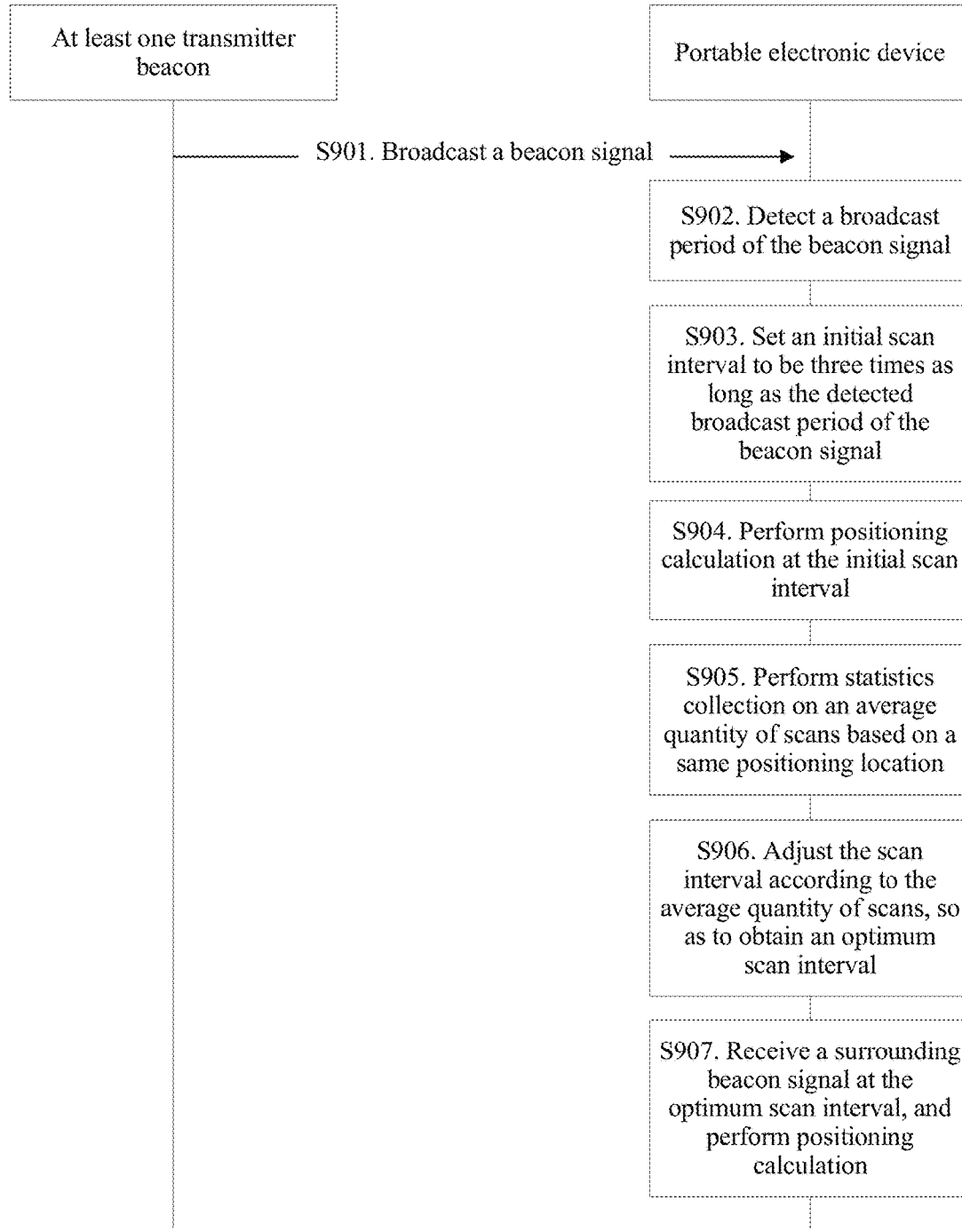
Figure 10A:
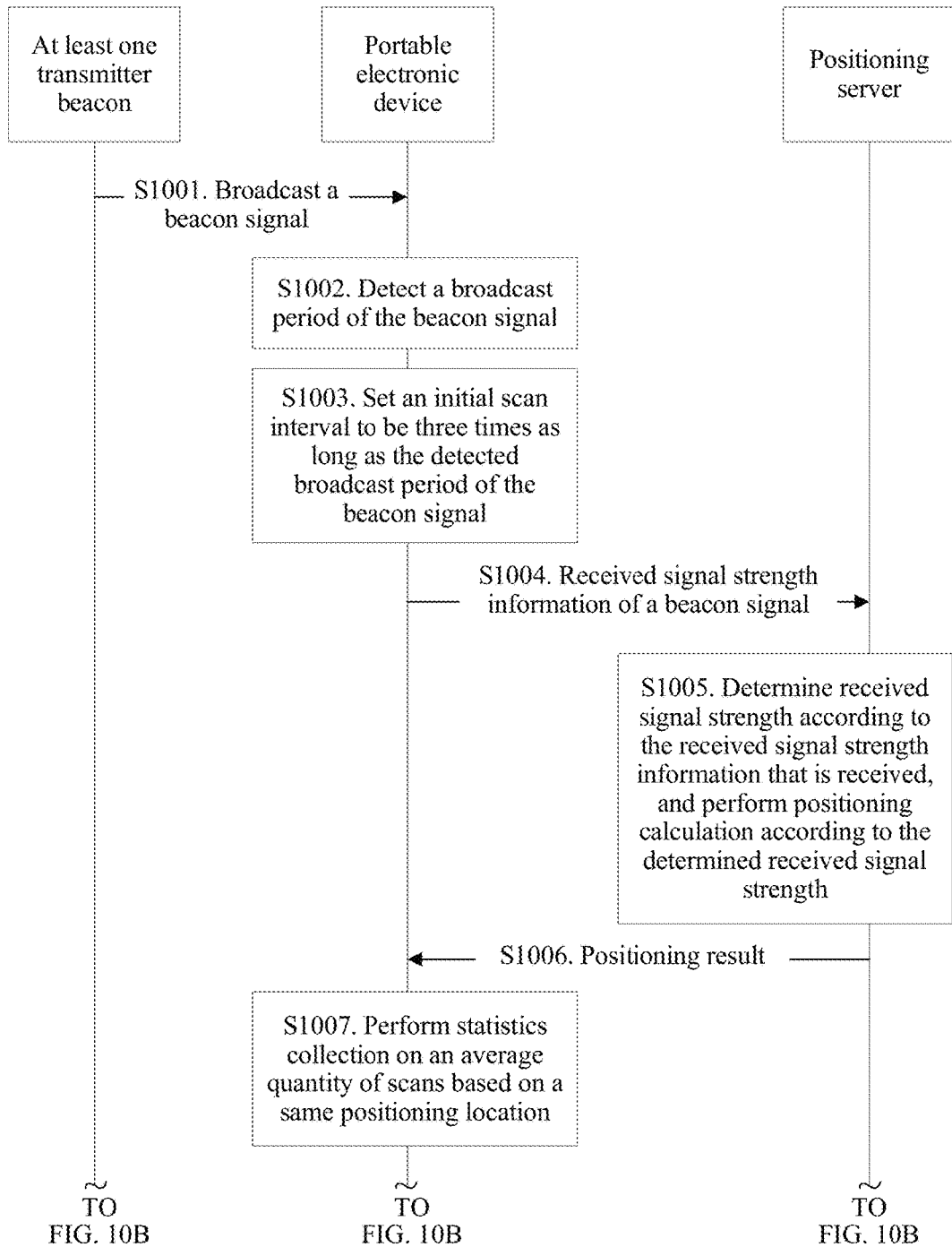
Figure 10B:
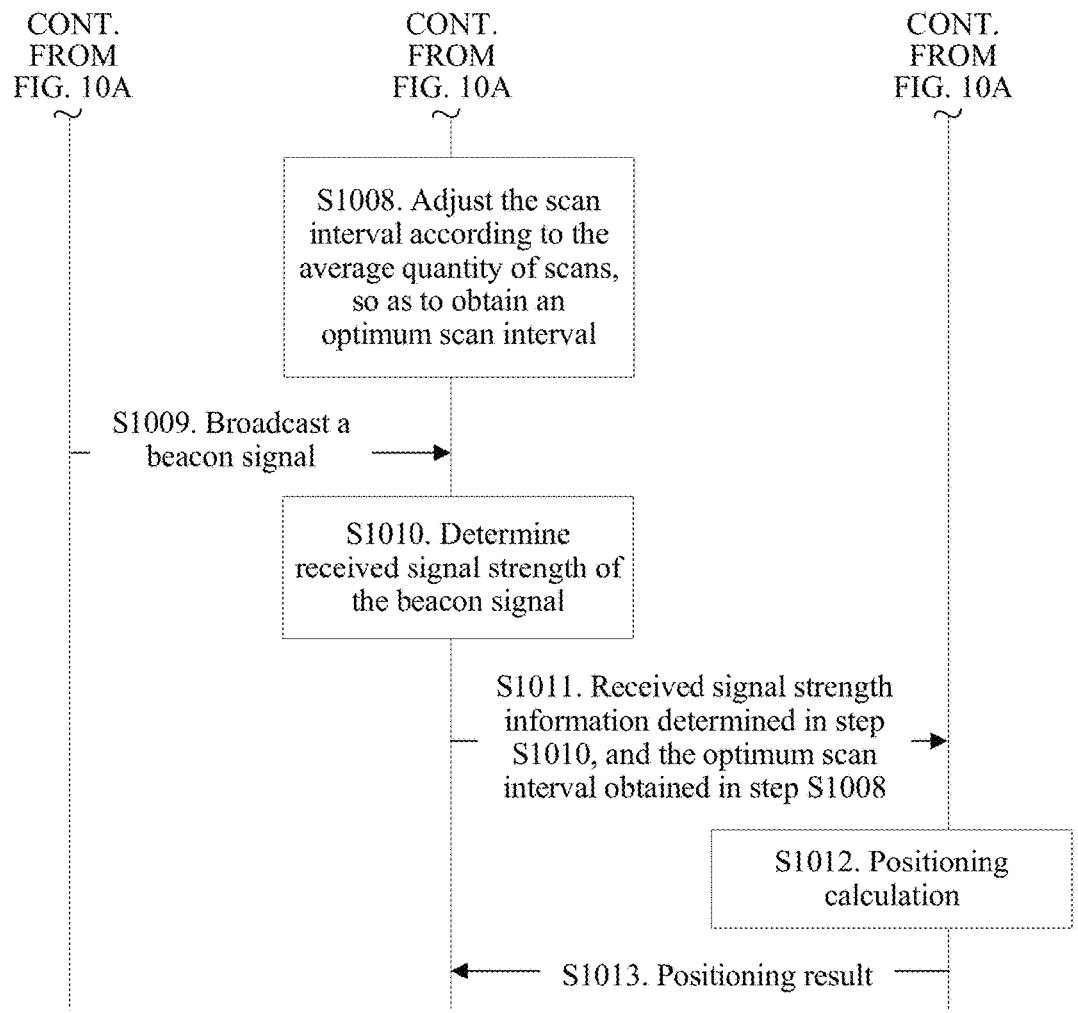
Figure 11:
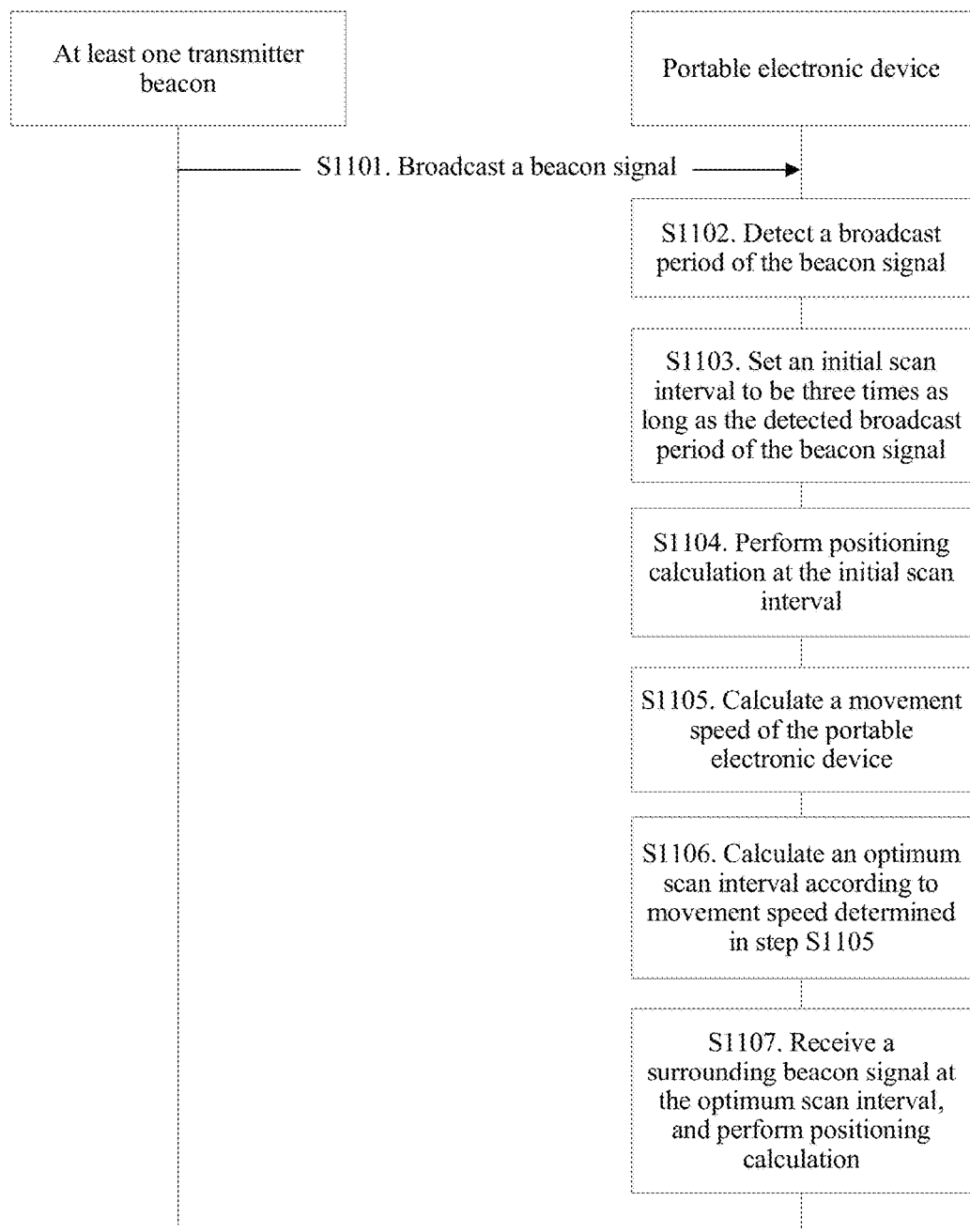
Figure 12A:
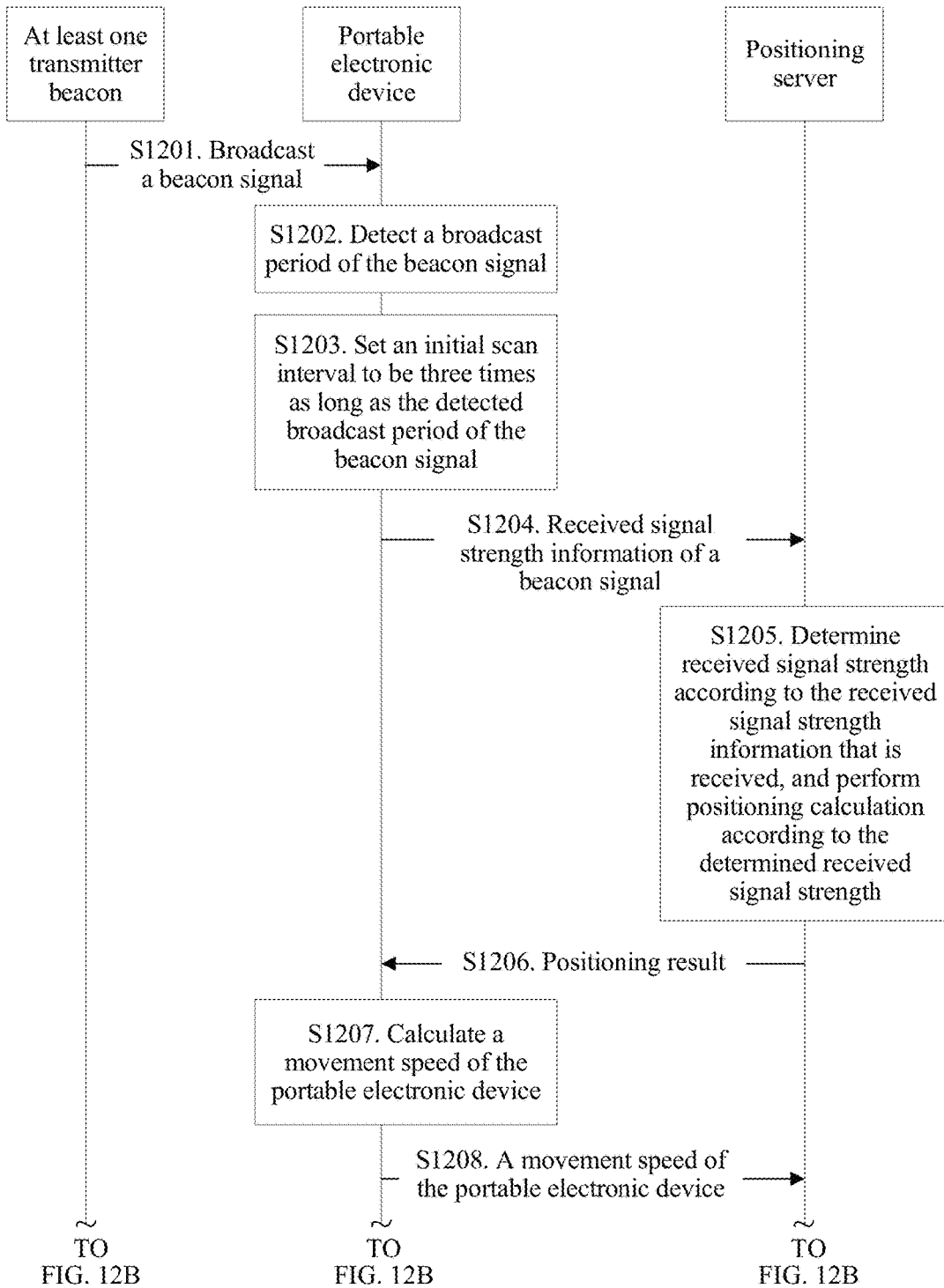
Figure 12B:
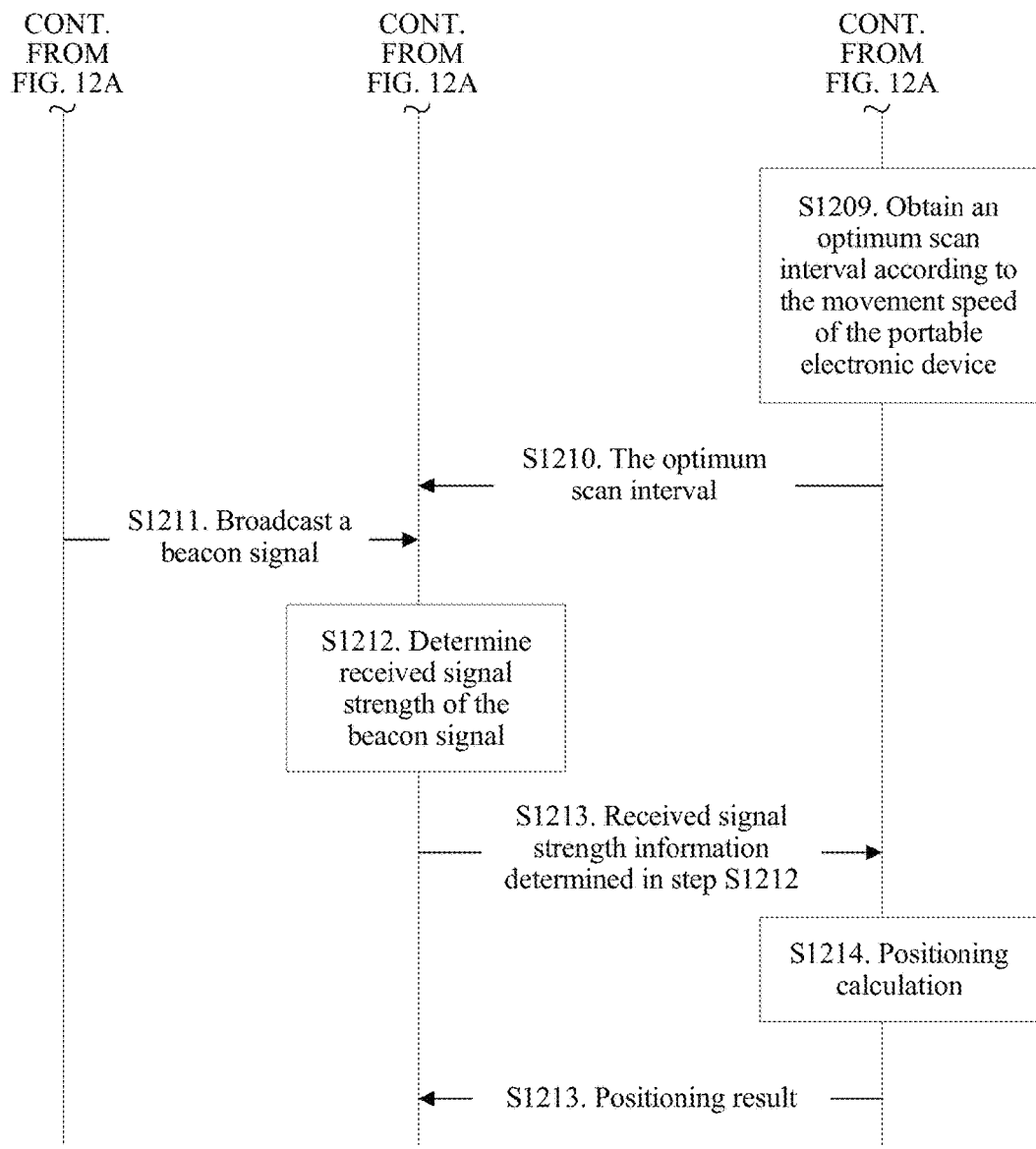

In the procedures shown in FIG. 9, FIG. 10A, and FIG. 10B, the portable electronic device adjusts a scan interval in Manner 1 to perform positioning calculation; and in the procedures shown in FIG. 11, FIG. 12A, and FIG. 12B, Manner 2 is adopted.

In the procedures shown in FIG. 9 to FIG. 12A and FIG. 12B, in a positioning area, a quantity of frequency channel numbers that can be used for transmitting a beacon signal by a beacon is 3.

In the procedures shown in FIG. 9, FIG. 10A, and FIG. 10B, for a method for determining an optimum scan interval, refer to the procedure shown in FIG. 5A and FIG. 5B; and in the time interval procedures shown in FIG. 11, FIG. 12A, and FIG. 12B, for a method for determining an optimum scan interval, refer to the procedure shown in FIG. 8. Optionally, when sending received signal strength information of a beacon signal to the positioning server, the portable electronic device may indicate a scan interval corresponding to each piece of received signal strength. For example, for received signal strength in a same scan interval, when sending received signal strength information to the positioning server, the portable electronic device indicates an identifier of the scan interval corresponding to the information. In this way, after receiving the received signal strength information, the positioning server may determine which received signal strength is in a same scan interval, and may obtain a positioning result according to the received signal strength in the same scan interval when performing the positioning calculation.

In the procedures shown in FIG. 10A, FIG. 10B, FIG. 12A, and FIG. 12B, the procedure shown in FIG. 9 may include the following steps:

S901. The portable electronic device receives a beacon signal broadcast by a beacon in a positioning area.

S902. Detect a broadcast period of the beacon signal (for example, the first broadcast period).

S903. Obtain an initial scan interval (for example, the first scan interval) according to the detected broadcast period of the beacon signal, where the initial scan interval is three times as long as the broadcast period of the beacon signal.

S904. Perform positioning calculation at the initial scan interval.

S905. Perform statistics collection on an average quantity of scans based on a same positioning location.

S906. Adjust the scan interval T_scan according to the average quantity of scans, where an adjustment step is ΔT_scan, to obtain a steady scan interval T_scan0, that is, an optimum scan interval.

S907. Receive a surrounding beacon signal at the optimum scan interval T_scan0, and perform positioning calculation.

The procedure shown in FIG. 10A and FIG. 10B may include the following steps:

S1001. The portable electronic device receives a beacon signal broadcast by a beacon in a positioning area.

S1002. The portable electronic device detects a broadcast period of the beacon signal (for example, the first broadcast period).

S1003. The portable electronic device obtains an initial scan interval (for example, the first scan interval) according to the detected broadcast period of the beacon signal, where the initial scan interval is three times as long as the broadcast period of the beacon signal.

S1004. The portable electronic device sends, to the positioning server, received signal strength information of beacon signals received in m continuous first scan intervals.

S1005. The positioning server determines, according to the received signal strength information that is received, received signal strength of the beacon signals that are received by the portable electronic device, and then performs positioning calculation according to the determined received signal strength, to obtain a positioning result corresponding to each first scan interval in the m continuous first scan intervals.

S1006. The positioning server sends the positioning result obtained by performing the positioning calculation to the portable electronic device.

S1007. The portable electronic device performs statistics collection, according to the positioning result received in step S1005, on an average quantity of scans based on a same positioning location in the m continuous scan intervals.

S1008. The portable electronic device adjusts the scan interval T_scan according to the average quantity of scans, where an adjustment step is ΔT_scan, to obtain a steady scan interval T_scan0, that is, an optimum scan interval.

Optionally, step S1006 may also be performed by the positioning server, and the positioning server sends the optimum scan interval obtained by means of calculation to the portable electronic device.

S1009. The portable electronic device receives a surrounding beacon signal at the optimum scan interval T_scan0.

S1010. The portable electronic device determines received signal strength of the beacon signal received in step S1009.

S1011. The portable electronic device sends received signal strength information determined in step S1010 to the positioning server.

S1012. The positioning server determines the received signal strength of the beacon signal according to the received signal strength information that is received, and performs positioning calculation according to the determined received signal strength, to obtain a positioning result.

S1013. The positioning server feeds back the positioning result obtained in step S1012 to the portable electronic device.

The procedure shown in FIG. 11 includes the following steps:

S1101. The portable electronic device receives a beacon signal broadcast by a beacon in a positioning area.

S1102. Detect a broadcast period of the beacon signal (for example, the first broadcast period).

S1103. Obtain an initial scan interval (for example, the first scan interval) according to the detected broadcast period of the beacon signal, where the initial scan interval is three times as long as the broadcast period of the beacon signal.

S1104. Perform positioning calculation at the initial scan interval.

S1105. Calculate a movement speed of the portable electronic device.

S1106. Calculate an optimum scan interval T_scan0 according to determined movement speed.

S1107. Receive a surrounding beacon signal, and perform positioning calculation at the optimum scan interval T_scan0.

The procedure shown in FIG. 12A and FIG. 12B may include the following steps:

S1201. The portable electronic device receives a beacon signal broadcast by a beacon in a positioning area.

S1202. The portable electronic device detects a broadcast period of the beacon signal (for example, the first broadcast period).

S1203. The portable electronic device obtains an initial scan interval (for example, the first scan interval) according to the detected broadcast period of the beacon signal, where the initial scan interval is three times as long as the broadcast period of the beacon signal.

S1204. The portable electronic device sends, to the positioning server, received signal strength information of beacon signals received in m continuous first scan intervals.

S1205. The positioning server determines, according to the received signal strength information that is received, received signal strength of the beacon signals that are received by the portable electronic device, and then performs positioning calculation according to the determined received signal strength, to obtain a positioning result corresponding to each first scan interval in the m continuous first scan intervals.

S1206. The positioning server sends the positioning result obtained by performing the positioning calculation in step S1205 to the portable electronic device.

S1207. The portable electronic device calculates a movement speed of the portable electronic device.

S1208. The portable electronic device reports the movement speed of the portable electronic device to the positioning server.

S1209. The positioning server obtains an optimum scan interval T_scan0 by means of calculation according to the movement speed of the portable electronic device.

S1210. The positioning server sends the optimum scan interval T_scan0 obtained by means of calculation to the portable electronic device.

S1211. The portable electronic device receives a surrounding beacon signal at the optimum scan interval T_scan0.

S1212. The portable electronic device determines received signal strength of the receive beacon signal.

S1213. The portable electronic device sends received signal strength information determined in step S1212 to the positioning server.

S1214. The positioning server determines the received signal strength according to the received signal strength information that is received, and performs positioning calculation according to the determined received signal strength, to obtain a positioning result.

S1215. The positioning server feeds back the positioning result obtained in step S1214 to the portable electronic device.

Figure 13:
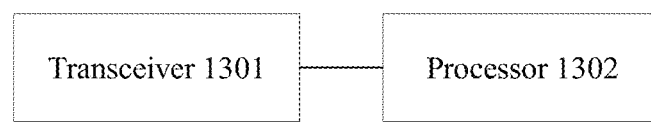
FIG. 13 is a schematic structural diagram of a portable electronic device according to an embodiment of this application.

FIG. 13 is a schematic structural diagram of a portable electronic device according to an embodiment of this application. As shown in FIG. 13, the portable electronic device includes:

a transceiver 1301, configured to receive a beacon signal; and a processor 1302, configured to: determine a first broadcast period according to the beacon signal received by the transceiver 1301, and determine a first scan interval according to the first broadcast period, where the first broadcast period is a broadcast period of a beacon signal detected by the portable electronic device in a positioning area.

The transceiver 1301 is further configured to receive a beacon signal by using the first scan interval as an interval.

The processor 1302 is further configured to: obtain a first positioning result according to received signal strength indicators RSSIs of beacon signals received by the transceiver 1301 in m continuous first scan intervals, and adjust the first scan interval to obtain a second scan interval according to the first positioning result, where an average quantity of scans may be determined by the second scan interval, and the average quantity of scans is greater than the first scan interval.

The transceiver 1301 is further configured to receive a beacon signal by using the second scan interval as an interval.

The processor 1302 is further configured to obtain a second positioning result according to received signal strength of beacon signals received by the transceiver 1301 in m continuous second scan intervals.

In an optional implementation, when adjusting the scan interval, the processor 1302 may determine the average quantity of scans according to the first positioning result, and may adjust the scan interval to obtain the second scan interval when the determined average quantity of scans is greater than a preset threshold of an average quantity of scans.

In this optional implementation, for other processing of the portable electronic device, refer to the procedure shown in FIG. 5A and FIG. 5B. The processor 1302 is configured to: obtain a positioning result, adjust the scan interval, and the like. The transceiver 1301 is configured to receive the beacon signal.

In another optional implementation, when adjusting the scan interval according to a movement speed of the portable electronic device, the processor 1302 may determine the average quantity of scans according to the first positioning result, and may adjust the scan interval to obtain the second scan interval when the movement speed is lower than a preset movement speed threshold.

In this optional implementation, for other processing of the portable electronic device, refer to the procedure shown in FIG. 8. The processor 1302 is configured to: obtain a positioning result, adjust the scan interval, determine the movement speed of the portable electronic device, and the like. The transceiver 1301 is configured to: receive the beacon signal, and optionally, communicate with a positioning server. When receiving the beacon signal, the transceiver 1301 may be the first communications circuit 1021 in FIG. 2; and when communicating with the positioning server, the transceiver 1301 may be the second communications circuit 1022.

Optionally, the processor 1302 may be replaced with a processing unit, and the transceiver 1301 may be replaced with a transceiver unit. When the portable electronic device is in a Bluetooth positioning system, the transceiver 1301 in the portable electronic device may be a Bluetooth module. The Bluetooth module is provided with an antenna inside, and configured to: communicate with a Bluetooth beacon in the Bluetooth positioning system, receive a beacon signal sent by the Bluetooth beacon, and perform protocol processing on the received beacon signal according to a Bluetooth communications protocol. The processor 1302 may be a central processing unit (Central Processing Unit, CPU), for example, a 4-kernel CPU and an 8-kernal CPU.

Figure 14:
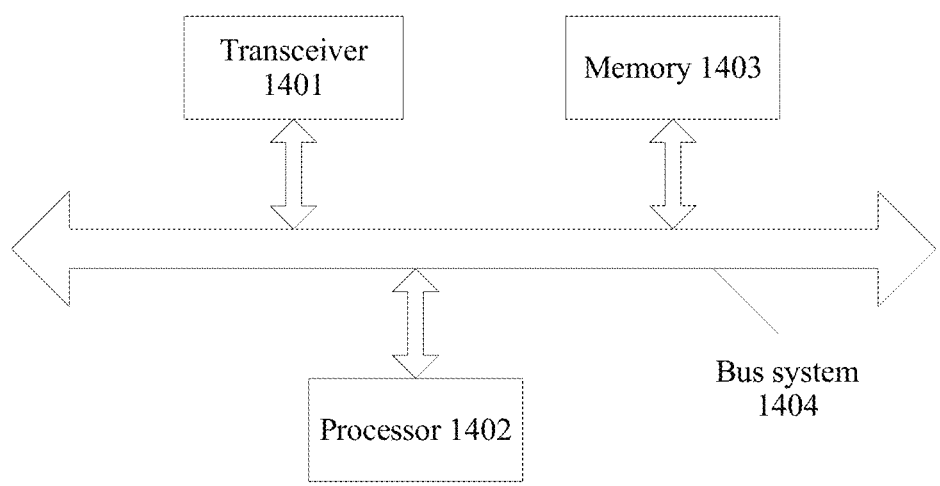
FIG. 14 is a schematic structural diagram of another portable electronic device according to an embodiment of this application.

FIG. 14 is a schematic structural diagram of another portable electronic device according to an embodiment of this application. As shown in FIG. 14, the portable electronic device includes:

a transceiver 1401, a processor 1402, and a memory 1403, where for implementation of the transceiver 1401, refer to that of the transceiver 1301; and for implementation of the processor 1402, refer to that of the processor 1302.

The memory 1403 stores one or more programs, the one or more programs include an instruction or instructions, and the processor 1401 calls the instruction, so as to perform the positioning method in the embodiments of this application.

The processor 1402, the memory 1403, and the transceiver 1401 are connected to each other by using a bus system 1404.

When the portable electronic device is in a Bluetooth positioning system, the transceiver 1401 in the portable electronic device may be a Bluetooth module. The Bluetooth module is provided with an antenna inside, and configured to: communicate with a Bluetooth beacon in the Bluetooth positioning system, receive a beacon signal sent by the Bluetooth beacon, and perform protocol processing on the received beacon signal according to a Bluetooth communications protocol. The processor 1402 may be a CPU, for example, a 4-core CPU and an 8-core CPU.

The instruction used for implementing the positioning method may be embedded into an operating system (Operation System, OS) of the portable electronic device, be decoupled to an upper-layer positioning application, and provides the upper-layer positioning application with an application programming interface (Application Programming Interface, API) for high-accuracy positioning, so that the high-accuracy positioning can be implemented.

In an optional implementation, the instruction stored in the memory 1403 is used for implementing the method shown in FIG. 5A and FIG. 5B; for specific implementation, refer to the procedure and the related description shown in FIG. 5A and FIG. 5B. In another optional implementation, the instruction stored in the memory 1403 is used for implementing the method shown in FIG. 8; for specific implementation, refer to the procedure and the related description shown in FIG. 8.

In conclusion, the embodiments of this application provide the positioning method, the portable electronic device, and the wireless positioning system. The movement speed of the portable electronic device is measured to adjust the scan interval, so that the scan packet loss rate can be effectively reduced, and the positioning precision is improved. A jump occurring in positioning locations in a positioning result is avoided, so that the positioning ambiguity is reduced, and the positioning delay can be effectively reduced by setting an appropriate scan interval, thereby improving user experience in a positioning process.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A portable electronic device, comprising:
a transceiver configured to receive a first beacon signal; and
a processor coupled to the transceiver and configured to:
determine a first broadcast period according to the first beacon signal, the first broadcast period being a broadcast period of the first beacon signal detected by the portable electronic device in a positioning area; and
determine a first scan interval according to the first broadcast period,
the transceiver being further configured to receive a second beacon signal using the first scan interval as an interval,
the processor being further configured to:
obtain, according to received signal strength indicators (RSSIs) of beacon signals received by the transceiver in m continuous first scan intervals, a first positioning result comprising m positioning locations; and
adjust the first scan interval to obtain a second scan interval when an average quantity of scans is greater than a preset value according to the m positioning locations, the second scan interval being greater than the first scan interval, a $k^{th}$ positioning location in the m positioning locations being obtained according to an RSSI of a beacon signal received in a $k^{th}$ first scan interval in the m continuous first scan intervals, the m being a preset integer greater than one, and k being an integer greater than one and not greater than the m,
the transceiver being further configured to receive a third beacon signal using the second scan interval as an interval, and
the processor being further configured to obtain, according to RSSIs of beacon signals received by the transceiver in p continuous second scan intervals, a second positioning result comprising p other positioning locations, a $j^{th}$ positioning location in the p other positioning locations being obtained according to an RSSI of a beacon signal received in a $j^{th}$ second scan interval in the p continuous second scan intervals, the p being a preset integer greater than one, and j being an integer greater than one and not greater than the p.

2. The portable electronic device of claim 1, wherein the average quantity of scans is not greater than the preset value according to the p other positioning locations and a location jump occurs in the p other positioning locations, and the processor is further configured to reduce the second scan interval until no location jump occurs in a positioning location comprised in an obtained positioning result.

3. The portable electronic device of claim 1, wherein the processor is further configured to skip changing the second scan interval when the average quantity of scans is not greater than the preset value according to the p other positioning locations and no location jump occurs in the p other positioning locations.

4. The portable electronic device of claim 1, wherein in a manner of determining the first scan interval, the processor is further configured to determine that the first scan interval is three times as long as the first broadcast period.

5. The portable electronic device of claim 1, wherein in a manner of determining the first broadcast period, the processor is further configured to:
separate the first beacon signal received by the transceiver to obtain n groups of beacon signals, the n being an integer greater than one, beacon signals in a group being received from a same source, and beacon signals in different groups being received from different sources; and perform the following operations on each group of beacon signals in the n groups of beacon signals:

calculate an interval duration between two neighboring beacon signals according to a time sequence of receiving all beacon signals in a group of beacon signals to obtain an interval duration sequence;

screen interval durations from the obtained interval duration sequence according to a preset first threshold such that a difference between any two screened interval durations to be less than the first threshold;

determine a second broadcast period of the group of beacon signals according to at least one of all screened interval durations;

remove a second broadcast period from obtained n second broadcast periods, a difference between the second broadcast period and another second broadcast period being greater than a preset second threshold; and determine the first broadcast period according to at least one of all remaining second broadcast periods in the n second broadcast periods.

6. A method, applied to a portable electronic device, comprising:

receiving a first beacon signal;

determining a first broadcast period according to the first beacon signal, the first broadcast period being a broadcast period of the first beacon signal detected by the portable electronic device in a positioning area;

determining a first scan interval according to the first broadcast period;

receiving a second beacon signal using the first scan interval as an interval;

obtaining, according to received signal strength indicators (RSSIs) of beacon signals received in m continuous first scan intervals, a first positioning result comprising m positioning locations;

adjusting the first scan interval to obtain a second scan interval when an average quantity of scans is greater than a preset value according to the m positioning locations, the second scan interval being greater than the first scan interval, a $k^{th}$ positioning location in the m positioning locations being obtained according to an RSSI of a beacon signal received in a k first scan interval in the m continuous first scan intervals, the m being a preset integer greater than one, and k being an integer greater than one and not greater than the m;

receiving a third beacon signal using the second scan interval as an interval; and obtaining, according to RSSIs of beacon signals received in p continuous second scan intervals, a second positioning result comprising p other positioning locations, a $j^{th}$ positioning location in the p other positioning locations being obtained according to an RSSI of a beacon signal received in a $j^{th}$ second scan interval in the p continuous second scan intervals, the p being a preset integer greater than one, and j being an integer greater than one and not greater than the p.

7. The method of claim 6, wherein the average quantity of scans is not greater than the preset value according to the p other positioning locations and a location jump occurs in the p other positioning locations, and the method further comprises reducing the second scan interval until no location jump occurs in a positioning location comprised in an obtained positioning result.

8. The method of claim 6, further comprising skip changing the second scan interval when the average quantity of scans is not greater than the preset value according to the p other positioning locations and no location jump occurs in the p other positioning locations.

9. The method of claim 6, wherein determining the first scan interval comprises determining that the first scan interval is three times as long as the first broadcast period.

10. The method of claim 6, wherein determining the first broadcast period comprises:

separating the first beacon signal to obtain n groups of beacon signals, the n being an integer greater than one, beacon signals in a group being received from a same source, and beacon signals in different groups being received from different sources; and performing the following operations on each group of beacon signals in the n groups of beacon signals:

calculating a receiving time interval between two neighboring beacon signals in a group of beacon signals to obtain a time interval sequence;

screening time intervals from the obtained time interval sequence according to a preset time interval difference threshold such that a difference between any two screened time intervals is less than the preset time interval difference threshold;

obtaining a second broadcast period of the group of beacon signals by calculation according to the screened time intervals;

removing a second broadcast period from obtained n second broadcast periods, a difference between the second broadcast period and another second broadcast period being greater than a preset broadcast period difference threshold; and determining the first broadcast period according to a remaining second broadcast period in the n second broadcast periods.

11. A non-transitory computer readable storage medium storing one or more programs, the one or more programs comprising an instruction, and in which when executed by a portable electronic device, the instruction causing the portable electronic device to:

receive a first beacon signal;

determine a first broadcast period according to the first beacon signal, the first broadcast period being a broadcast period of the first beacon signal detected by the portable electronic device in a positioning area;

determine a first scan interval according to the first broadcast period;

receive a second beacon signal using the first scan interval as an interval;

obtain, according to received signal strength indicators (RSSIs) of beacon signals received in m continuous first scan intervals, a first positioning result comprising m positioning locations;

adjust the first scan interval to obtain a second scan interval when an average quantity of scans is greater than a preset value according to the m positioning locations, the second scan interval being greater than the first scan interval, a $k^{th}$ positioning location in the m positioning locations being obtained according to an RSSI of a beacon signal received in a $k^{th}$ first scan interval in the m continuous first scan intervals, the m being a preset integer greater than one, and k being an integer greater than one and not greater than the m;

receive a third beacon signal using the second scan interval as an interval; and obtain, according to RSSIs of beacon signals received in p continuous second scan intervals, a second positioning result comprising p other positioning locations, a $j^{th}$ positioning location in the p other positioning locations being obtained according to an RSSI of a beacon signal received in a $j^{th}$ second scan interval in the p continuous second scan intervals, the p being a preset integer greater than one, and j being an integer greater than one and not greater than the p.

12. The non-transitory computer readable medium of claim 11, wherein the average quantity of scans is not greater than the preset value according to the p other positioning locations and a location jump occurs in the p other positioning locations, the instruction further causes the portable electronic device to reduce the second scan interval until no location jump occurs in a positioning location comprised in an obtained positioning result.

13. The non-transitory computer readable medium of claim 11, wherein the instruction further causes the portable electronic device to skip changing the second scan interval when the average quantity of scans is not greater than the preset value according to the p other positioning locations and no location jump occurs in the p other positioning locations.

14. The non-transitory computer readable medium of claim 11, wherein in a manner of determining the first scan interval, the instruction further causes the portable electronic device to determine that the first scan interval is three times as long as the first broadcast period.

15. The non-transitory computer readable medium of claim 11, wherein in a manner of determining the first broadcast period, the instruction further causes the portable electronic device to:
- separate the first beacon signal to obtain n groups of beacon signals, the n being an integer greater than one, beacon signals in a group being received from a same source, and beacon signals in different groups being received from different sources; and
- perform the following operations on each group of beacon signals in the n groups of beacon signals:
  - calculate a receiving time interval between two neighboring beacon signals in a group of beacon signals to obtain a time interval sequence;
  - screen time intervals from the obtained time interval sequence according to a preset time interval difference threshold such that a difference between any two screened time intervals is less than the preset time interval difference threshold;
  - obtain a second broadcast period of the group of beacon signals by calculation according to the screened time intervals;
  - removing a second broadcast period from obtained n second broadcast periods, a difference between the second broadcast period and another second broadcast period being greater than a preset broadcast period difference threshold; and
  - determine the first broadcast period according to a remaining second broadcast period in the n second broadcast periods.

* * * * *